United States Patent
Hu et al.

(10) Patent No.: US 12,425,847 B2
(45) Date of Patent: Sep. 23, 2025

(54) SECURITY ACTIVATION METHOD AND COMMUNICATION APPARATUS

(71) Applicant: HUAWEI TECHNOLOGIES CO., LTD., Guangdong (CN)

(72) Inventors: Li Hu, Shanghai (CN); He Li, Shanghai (CN); Rong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 18/502,410

(22) Filed: Nov. 6, 2023

(65) Prior Publication Data

US 2024/0073681 A1    Feb. 29, 2024

Related U.S. Application Data

(63) Continuation of application No. PCT/CN2022/091572, filed on May 7, 2022.

(30) Foreign Application Priority Data

| May 8, 2021 | (CN) | ......................... 202110502511.3 |
| May 10, 2021 | (CN) | ......................... 202110506910.7 |
| Aug. 6, 2021 | (CN) | ......................... 202110904025.4 |

(51) Int. Cl.
*H04L 29/06* (2006.01)
*H04W 12/033* (2021.01)
*H04W 12/10* (2021.01)

(52) U.S. Cl.
CPC ......... *H04W 12/033* (2021.01); *H04W 12/10* (2013.01)

(58) Field of Classification Search
None
See application file for complete search history.

(56) References Cited

U.S. PATENT DOCUMENTS

| 2018/0083688 A1* | 3/2018 | Agiwal | ................. H04W 76/19 |
| 2018/0368200 A1* | 12/2018 | Jin | ......................... H04L 1/1867 |
| 2019/0082325 A1* | 3/2019 | Muhanna | ............... H04W 12/04 |
| 2019/0150037 A1* | 5/2019 | Mildh | ................. H04W 36/0005 370/331 |

(Continued)

OTHER PUBLICATIONS

Kahn, Colin; Viswanathan, Harish. Access independent mobile core networks. 2015 IEEE Wireless Communications and Networking Conference Workshops (WCNCW). https://ieeexplore.ieee.org/stamp/stamp.jsp?tp=&arnumber=7122521 (Year: 2015).*

(Continued)

*Primary Examiner* — Jeremiah L Avery
(74) *Attorney, Agent, or Firm* — Fish & Richardson P.C.

(57) ABSTRACT

This application provides security activation methods and communication apparatuses. In an example method, a first access network device in a first communication standard requests a second access network device in a second communication standard to allocate a resource for dual connectivity of a terminal device, and sends, to the second access network device, a user plane security policy. The first access network device further receives identification information of a bearer and a security activation status from the second access network device and sends the identification information of the bearer and the security activation status to the terminal device.

20 Claims, 15 Drawing Sheets

(56) References Cited

U.S. PATENT DOCUMENTS

| | | | |
|---|---|---|---|
| 2019/0182881 A1* | 6/2019 | Teyeb | H04L 5/001 |
| 2019/0373663 A1* | 12/2019 | Yu | H04W 76/18 |
| 2020/0008167 A1* | 1/2020 | Venkataraman | H04W 76/16 |
| 2020/0053815 A1* | 2/2020 | Teyeb | H04W 76/11 |
| 2020/0068639 A1* | 2/2020 | Kim | H04W 76/16 |
| 2020/0120736 A1* | 4/2020 | Xu | H04W 28/0236 |
| 2020/0128398 A1* | 4/2020 | Wifvesson | H04W 12/10 |
| 2020/0137574 A1* | 4/2020 | Dhanapal | H04W 28/0231 |
| 2020/0145211 A1* | 5/2020 | Lee | H04L 9/0825 |
| 2020/0154499 A1* | 5/2020 | Futaki | H04W 76/15 |
| 2020/0163140 A1* | 5/2020 | Mochizuki | H04W 36/0069 |
| 2020/0169887 A1* | 5/2020 | Wager | H04W 12/106 |
| 2020/0170071 A1* | 5/2020 | Mildh | H04W 80/08 |
| 2020/0214070 A1* | 7/2020 | Ingale | H04W 76/19 |
| 2020/0229259 A1* | 7/2020 | Teyeb | H04W 76/19 |
| 2020/0236554 A1* | 7/2020 | Lee | H04W 12/03 |
| 2020/0252822 A1* | 8/2020 | Kim | H04L 5/0048 |
| 2020/0275519 A1* | 8/2020 | Sharma | H04W 12/04 |
| 2020/0344605 A1* | 10/2020 | Lee | H04W 12/106 |
| 2020/0374320 A1 | 11/2020 | Li et al. | |
| 2020/0374961 A1* | 11/2020 | Ingale | H04W 76/20 |
| 2021/0067966 A1* | 3/2021 | Teyeb | H04W 76/27 |
| 2021/0076218 A1* | 3/2021 | Wifvesson | H04W 36/0027 |
| 2021/0136584 A1* | 5/2021 | Byun | H04W 12/106 |
| 2021/0152350 A1* | 5/2021 | Ai | H04W 76/19 |
| 2021/0329460 A1* | 10/2021 | Liao | H04W 12/37 |
| 2021/0329723 A1* | 10/2021 | Teyeb | H04W 36/00698 |

OTHER PUBLICATIONS

Rajhi, Mohammed. Security Procedures for User-Centric Ultra-Dense 5G Networks. 2021 IEEE International IOT, Electronics and Mechatronics Conference (IEMTRONICS). https://ieeexplore.ieee.org/stamp/stamp.jsp?tp=&arnumber=9422599 (Year: 2021).*

Mumtaz, Tariq et al. Dual Connectivity-Based Mobility Management and Data Split Mechanism in 4G/5G Cellular Networks. IEEE Access, vol. 8. https://ieeexplore.ieee.org/stamp/stamp.jsp?tp=&arnumber=9087860 (Year: 2020).*

Agiwal, Mamta et al. A Survey on 4G-5G Dual Connectivity: Road to 5G Implementation. IEEE Access, vol. 9. https://ieeexplore.ieee.org/stamp/stamp.jsp?tp=&arnumber=9328255 (Year: 2021).*

Extended European Search Report in European Appln No. 22806665.0, dated Jul. 16, 2024, 13 pages.

* cited by examiner

SECURITY ACTIVATION METHOD AND COMMUNICATION APPARATUS

CROSS-REFERENCE TO RELATED APPLICATIONS

This application is a continuation of International Application No. PCT/CN2022/091572, filed on May 7, 2022, which claims priority to Chinese Patent Application No. 202110502511.3, filed on May 8, 2021, and Chinese Patent Application No. 202110506910.7, filed on May 10, 2021, and Chinese Patent Application No. 202110904025.4, filed on Aug. 6, 2021. All of the aforementioned patent applications are hereby incorporated by reference in their entireties.

TECHNICAL FIELD

This application relates to the field of wireless communication technologies, and in particular, to a security activation method and a communication apparatus.

BACKGROUND

An on-demand user plane security protection mechanism is a security mechanism in a 5G network. The on-demand user plane security protection mechanism relates to user plane encryption protection and user plane integrity protection, and requires an access network device to determine, according to a user plane security policy received from a core network device, whether to enable user plane encryption protection and user plane integrity protection between the access network device and a terminal device, to provide more flexible user plane security for the terminal device.

In the conventional technology, a 4G network does not support the on-demand user plane security protection mechanism. In the 4G network, user plane security between an access network device and a terminal device is fixed as follows: User plane encryption protection is enabled, and user plane integrity protection is disabled. As the 4G network is still in use in a short term, the industry has studied for applying the on-demand user plane security protection mechanism to the 4G network through participation of an access network device and a related core network device (for example, a mobility management entity (mobility management entity, MME)) in the network.

In a process of transition from the 4G network to a 5G network, a non-standalone (non-standalone, NSA) deployment manner emerges. A terminal device is connected to both an evolved NodeB (eNB) in the 4G network and a next generation NodeB (next generation NodeB, gNB) in the 5G network in a dual connectivity manner.

After the on-demand user plane security protection mechanism is introduced to the 4G network, how to implement the on-demand user plane security protection mechanism in the NSA deployment manner is an urgent problem to be resolved currently.

SUMMARY

Embodiments of this application provide a security activation method and a communication apparatus, to enable user plane security between a terminal device and a secondary access network device in dual connectivity in an NSA deployment manner.

According to a first aspect, an embodiment of this application provides a security activation method. The method may be performed by a first access network device, or may be performed by a component (for example, a chip or a circuit) configured in a first access network device.

The method includes: The first access network device in a first communication standard requests a second access network device in a second communication standard to allocate a resource for dual connectivity of a terminal device, and sends first indication information to the second access network device, where the first indication information indicates that the terminal device supports user plane security protection, and the first access network device is a master access network device in the dual connectivity of the terminal device; the first access network device receives identification information of a bearer and a security activation status from the second access network device; and the first access network device sends the identification information of the bearer and the security activation status to the terminal device, where the security activation status indicates whether to enable user plane encryption protection and/or user plane integrity protection of the bearer.

In the foregoing technical solution, processing logic of the first access network device used as the master access network device and the second access network device used as the secondary access network device in a secondary station addition procedure in an inter-system dual connectivity scenario is enhanced. The first access network device may send, to the second access network device, the first indication information indicating that the terminal device supports the user plane security protection, or further send the user plane security policy. The second access network device determines the security activation status based on the first indication information and the user plane security policy, and sends the security activation status to the terminal device. In this way, on-demand enablement of user plane security between the terminal device and the second access network device is implemented. In addition, the first access network device may further determine, based on the user plane integrity protection policy, whether the second access network device supports the user plane security protection, to avoid a problem that when the user plane integrity protection policy indicates "enabling", the second access network device ignores the user plane integrity protection policy because the second access network device does not support the user plane security protection, and consequently security is reduced.

In a possible design of the first aspect, the bearer is for transmission of user plane data between the terminal device and the second access network device.

In a possible design of the first aspect, the method further includes: The first access network device generates the first indication information based on a context of the terminal device.

In a possible design of the first aspect, the context of the terminal device includes a first security capability of the terminal device, the first security capability indicates that the terminal device supports the user plane security protection, and the first security capability corresponds to the first communication standard.

In a possible design of the first aspect, the context of the terminal device includes a first wireless capability of the terminal device, the first wireless capability indicates that the terminal device supports the user plane security protection, and the first wireless capability corresponds to the first communication standard.

In a possible design of the first aspect, if the user plane security policy is "required", a type of the first indication information is reject criticality information; or if the user plane security policy is not "required", a type of the first indication information is ignore criticality information.

In a possible design of the first aspect, the method further includes: The first access network device selects the second access network device based on the context of the terminal device, where the second access network device supports the user plane security protection.

In a possible design of the first aspect, the context of the terminal device includes the user plane security policy; and that the first access network device selects the second access network device based on the context of the terminal device includes: The first access network device selects the second access network device based on the user plane security policy if determining that the terminal device supports the user plane security protection.

In a possible design of the first aspect, the method further includes: The first access network device sends, to the second access network device, a user plane security policy that is from a core network device or that is preconfigured in the first access network device.

In a possible design of the first aspect, the method further includes: The first access network device receives enablement indication information from the terminal device, where the enablement indication information indicates that the terminal device has enabled user plane security with the second access network device; and the first access network device sends the enablement indication information to the second access network device.

In a possible design of the first aspect, the method further includes: The first access network device receives an enablement support indication from the second access network device, where the enablement support indication indicates that the second access network device supports the user plane security protection.

In a possible design of the first aspect, that the first access network device in the first communication standard requests the second access network device in the second communication standard to allocate the resource for the dual connectivity of the terminal device, and sends the first indication information to the second access network device includes: The first access network device sends a secondary station addition request to the second access network device, where the secondary station addition request includes the first indication information, and the secondary station addition request is used to request to allocate the resource for the dual connectivity of the terminal device. That the first access network device receives the identification information of the bearer and the security activation status from the second access network device includes: The first access network device receives a secondary station addition response from the second access network device, where the secondary station addition response includes the identification information of the bearer and the security activation status.

In a possible design of the first aspect, the secondary station addition request further includes the user plane security policy.

In a possible design of the first aspect, that the first access network device sends the identification information of the bearer and the security activation status to the terminal device includes: The first access network device sends a reconfiguration message to the terminal device, where the reconfiguration message includes the identification information of the bearer and the security activation status.

According to a second aspect, an embodiment of this application provides a security activation method. The method may be performed by a second access network device, or may be performed by a component (for example, a chip or a circuit) configured in a second access network device.

The method includes: The second access network device in a second communication standard accepts a request of a first access network device in a first communication standard for allocating a resource for dual connectivity of a terminal device, and receives first indication information from the first access network device, where the first indication information indicates that the terminal device supports user plane security protection; the second access network device determines a security activation status based on the first indication information and a user plane security policy; and the second access network device sends identification information of a bearer and the security activation status to the terminal device through the first access network device, where the security activation status indicates whether to enable user plane encryption protection and/or user plane integrity protection of the bearer.

In a possible design of the second aspect, the bearer is for transmission of user plane data between the terminal device and the second access network device.

In a possible design of the second aspect, the method further includes: The second access network device receives the user plane security policy from the first access network device. Alternatively, the user plane security policy is preconfigured in the second access network device.

In a possible design of the second aspect, if the user plane security policy is "required", a type of the first indication information is reject criticality information; or if the user plane security policy is not "required", a type of the first indication information is ignore criticality information.

In a possible design of the second aspect, the method further includes: The second access network device sends an enablement support indication to the first access network device, where the enablement support indication indicates that the second access network device supports the user plane security protection.

In a possible design of the second aspect, the method further includes: The second access network device receives enablement indication information from the terminal device through the first access network device, where the enablement indication information indicates that the terminal device has enabled user plane security with the second access network device.

In a possible design of the second aspect, the method further includes: The second access network device enables user plane security with the terminal device based on the security activation status.

In a possible design of the second aspect, that the second access network device in the second communication standard accepts the request of the first access network device in the first communication standard for allocating the resource for the dual connectivity of the terminal device, and receives the first indication information from the first access network device includes: The second access network device receives a secondary station addition request from the first access network device, where the secondary station addition request includes the first indication information, and the secondary station addition request is used to request to allocate the resource for the dual connectivity of the terminal device. That the second access network device sends the identification information of the bearer and the security activation status to the terminal device through the first access network device includes: The second access network device sends a secondary station addition response to the first access network device, where the secondary station addition response includes the identification information of the bearer and the security activation status.

In a possible design of the second aspect, the secondary station addition request includes the user plane security policy.

According to a third aspect, an embodiment of this application provides a security activation method. The method may be performed by a first access network device, or may be performed by a component (for example, a chip or a circuit) configured in a first access network device.

The method includes: A first access network device in a first communication standard selects, based on a context of a terminal device, a second access network device that is in a second communication standard and that supports user plane security protection, where the first access network device is a master access network device in dual connectivity of the terminal device; the first access network device requests the second access network device to allocate a resource for the dual connectivity of the terminal device, and sends a user plane security policy to the second access network device; the first access network device receives identification information of a bearer and a security activation status from the second access network device; and the first access network device sends the identification information of the bearer and the security activation status to the terminal device, where the security activation status indicates whether to enable user plane encryption protection and/or user plane integrity protection of the bearer.

In the foregoing technical solution, processing logic of the first access network device used as the master access network device and the second access network device used as the secondary access network device in a secondary station addition procedure in an inter-system dual connectivity scenario is enhanced. The first access network device determines whether the terminal device supports the user plane security protection. If the terminal device supports the user plane security protection, the first access network device selects, based on the user plane security policy, the second access network device that supports the user plane security protection, and sends the user plane security policy to the second access network device. The second access network device determines the security activation status based on the user plane security policy, and sends the security activation status to the terminal device. In this way, on-demand enablement of user plane security between the terminal device and the second access network device is implemented.

In a possible design of the third aspect, the bearer is for transmission of user plane data between the terminal device and the second access network device.

In a possible design of the third aspect, the context of the terminal device includes a first security capability of the terminal device, the first security capability indicates that the terminal device supports the user plane security protection, and the first security capability corresponds to the first communication standard.

In a possible design of the third aspect, the context of the terminal device includes a first wireless capability of the terminal device, the first wireless capability indicates that the terminal device supports the user plane security protection, and the first wireless capability corresponds to the first communication standard.

In a possible design of the third aspect, the user plane security policy is received by the first access network device from a core network device or is preconfigured in the first access network device.

In a possible design of the third aspect, the method further includes: The first access network device receives enablement indication information from the terminal device, where the enablement indication information indicates that the terminal device has enabled user plane security with the second access network device; and the first access network device sends the enablement indication information to the second access network device.

According to a fourth aspect, an embodiment of this application provides a security activation method. The method may be performed by a second access network device, or may be performed by a component (for example, a chip or a circuit) configured in a second access network device.

The method includes: The second access network device in a second communication standard accepts a request of a first access network device in a first communication standard for allocating a resource for dual connectivity of a terminal device, and receives a user plane security policy from the first access network device; the second access network device determines a security activation status based on the user plane security policy; and the second access network device sends identification information of a bearer and the security activation status to the terminal device through the first access network device, where the security activation status indicates whether to enable user plane encryption protection and/or user plane integrity protection of the bearer.

In a possible design of the fourth aspect, the bearer is for transmission of user plane data between the terminal device and the second access network device.

In a possible design of the fourth aspect, the method further includes: The second access network device receives enablement indication information from the terminal device through the first access network device, where the enablement indication information indicates that the terminal device has enabled user plane security with the second access network device.

In a possible design of the fourth aspect, the method further includes: The second access network device enables user plane security with the terminal device based on the security activation status.

According to a fifth aspect, an embodiment of this application provides a security activation method. The method may be performed by a second access network device, or may be performed by a component (for example, a chip or a circuit) configured in a second access network device.

The method includes: The second access network device in a second communication standard sends first request information to a terminal device through a first access network device in a first communication standard, where the first request information is used to request a support capability of the terminal device for user plane security, the second access network device is a secondary access network device in dual connectivity of the terminal device, and the first access network device is a master access network device in the dual connectivity of the terminal device; the second access network device receives second indication information from the terminal device through the first access network device, where the second indication information indicates that the terminal device supports user plane security protection; the second access network device determines a security activation status based on the second indication information and a user plane security policy; and the second access network device sends identification information of a bearer and the security activation status to the terminal device through the first access network device, where the security activation status indicates whether to enable user plane encryption protection and/or user plane integrity protection of the bearer.

In the foregoing technical solution, processing logic of the first access network device used as the master access network device and the second access network device used as the secondary access network device in a secondary station addition procedure in an inter-system dual connectivity scenario is enhanced. After receiving the request for allocating the resource for the dual connectivity of the terminal device, the second access network device may interact with the terminal device through the first access network device, to obtain the support capability of the terminal device for the user plane security. Then, when the terminal device supports the user plane security protection, the second access network device determines the security activation status based on the user plane security policy, and sends the security activation status to the terminal device. In this way, on-demand enablement of user plane security between the terminal device and the second access network device is implemented.

In a possible design of the fifth aspect, the bearer is for transmission of user plane data between the terminal device and the second access network device.

In a possible design of the fifth aspect, the user plane security policy is preconfigured in the second access network device.

In a possible design of the fifth aspect, the method further includes: The second access network device receives enablement indication information from the terminal device through the first access network device, where the enablement indication information indicates that the terminal device has enabled user plane security with the second access network device.

In a possible design of the fifth aspect, the method further includes: The second access network device enables user plane security with the terminal device based on the security activation status.

In a possible design of the fifth aspect, the method further includes: The second access network device receives a secondary station addition request from the first access network device, where the secondary station addition request is used to request to allocate the resource for the dual connectivity of the terminal device. That the second access network device sends the identification information of the bearer and the security activation status to the terminal device through the first access network device in the first communication standard includes: The second access network device sends a secondary station modification response to the first access network device, where the secondary station modification response includes the identification information of the bearer and the security activation status.

According to a sixth aspect, an embodiment of this application provides a security activation method. The method may be performed by a terminal device, or may be performed by a component (for example, a chip or a circuit) configured in a terminal device.

The method includes: The terminal device receives first request information from a second access network device in a second communication standard through a first access network device in a first communication standard, where the first request information is used to request a support capability of the terminal device for user plane security; and the terminal device sends second indication information to the second access network device through the first access network device, where the second indication information indicates that the terminal device supports user plane security protection.

In the foregoing technical solution, processing logic of the first access network device used as the master access network device and the second access network device used as the secondary access network device in a secondary station addition procedure in an inter-system dual connectivity scenario is enhanced. After receiving the secondary station addition request, if the second access network device receives no first indication information or user plane security policy, the second access network device may determine the security activation status based on the preconfigured user plane security policy, and send the security activation status to the terminal device. If the terminal device supports the user plane security protection, the terminal device may enable the user plane security with the second access network device based on the received security activation status, and send the enablement indication information. In this way, after receiving the enablement indication information sent by the terminal device, the second access network device can enable the user plane security with the terminal device, so that on-demand enablement of user plane security between the terminal device and the second access network device is implemented. If the terminal device does not support the user plane security protection, the terminal device may not perform any processing, for example, may discard or ignore the received identification information of the bearer and the received security activation status. It can be learned that, in this technical solution, when whether the terminal device supports the user plane security protection is not determined, the security activation status may be determined based on the preconfigured user plane security policy, and sent to the terminal device. Compared with a technical solution in which whether the terminal device has a capability of supporting the user plane security protection is confirmed with the terminal device before the security activation status is determined, this technical solution can effectively reduce signaling overheads.

In a possible design of the sixth aspect, the method further includes: The terminal device receives identification information of a bearer and a security activation status from the second access network device through the first access network device, where the security activation status indicates whether to enable user plane encryption protection and/or user plane integrity protection of the bearer; and the terminal device enables user plane security with the second access network device based on the security activation status.

In a possible design of the sixth aspect, the bearer is for transmission of user plane data between the terminal device and the second access network device.

In a possible design of the sixth aspect, the method further includes: The terminal device sends enablement indication information to the second access network device through the first access network device, where the enablement indication information indicates that the terminal device has enabled the user plane security with the second access network device.

According to a seventh aspect, an embodiment of this application provides a security activation method. The method may be performed by a second access network device, or may be performed by a component (for example, a chip or a circuit) configured in a second access network device.

The method includes: The second access network device in a second communication standard determines a security activation status based on a user plane security policy, where the second access network device is a secondary access network device in dual connectivity of a terminal device; the second access network device sends identification information of a bearer and the security activation status to the terminal device through a first access network device in a first communication standard, where the security activation status indicates whether to enable user plane encryption protection and/or user plane integrity protection of the bearer, and the first access network device is a master access network device in the dual connectivity of the terminal device; the second access network device receives enablement indication information from the terminal device through the first access network device, where the enablement indication information indicates that the terminal device has enabled user plane security with the second access network device; and the second access network device enables user plane security with the terminal device based on the enablement indication information and the security activation status.

In a possible design of the seventh aspect, the bearer is for transmission of user plane data between the terminal device and the second access network device.

In a possible design of the seventh aspect, the user plane security policy is preconfigured in the second access network device.

In a possible design of the seventh aspect, the method further includes: The second access network device sends acknowledgment indication information to the terminal device through the first access network device, where the acknowledgment indication information indicates the terminal device to send the enablement indication information after the terminal device enables the user plane security with the second access network device.

In a possible design of the seventh aspect, the method further includes: The second access network device receives a secondary station addition request from the first access network device, where the secondary station addition request is used to request to allocate the resource for the dual connectivity of the terminal device. That the second access network device sends the identification information of the bearer and the security activation status to the terminal device through the first access network device in the first communication standard includes: The second access network device sends a secondary station addition response to the first access network device, where the secondary station addition response includes the identification information of the bearer and the security activation status.

In a possible design of the seventh aspect, the secondary station addition response includes the acknowledgment indication information.

In a possible design of the seventh aspect, if the secondary station addition request message does not include first indication information, the second access network device determines the security activation status based on the user plane security policy, where the first indication information indicates that the terminal device supports the user plane security protection.

According to an eighth aspect, an embodiment of this application provides a security activation method. The method may be performed by a terminal device, or may be performed by a component (for example, a chip or a circuit) configured in a terminal device.

The method includes: The terminal device receives identification information of a bearer and a security activation status from a second access network device in a second communication standard through a first access network device in a first communication standard, where the security activation status indicates whether to enable user plane encryption protection and/or user plane integrity protection of the bearer; the terminal device enables user plane security with the second access network device based on the security activation status; and the terminal device sends enablement indication information to the second access network device through the first access network device, where the enablement indication information indicates that the terminal device has enabled the user plane security with the second access network device.

In a possible design of the eighth aspect, the bearer is for transmission of user plane data between the terminal device and the second access network device.

In a possible design of the eighth aspect, the method further includes: The terminal device receives acknowledgment indication information from the second access network device through the first access network device, where the acknowledgment indication information indicates the terminal device to send the enablement indication information after the terminal device enables the user plane security with the second access network device.

According to a ninth aspect, an embodiment of this application provides a communication apparatus. The communication apparatus has a function of implementing the first access network device or the second access network device in the foregoing aspects. The communication apparatus may be an access network device, or may be a chip included in an access network device. Optionally, the communication apparatus may alternatively have a function of implementing the terminal device in the foregoing aspects. The communication apparatus may be a terminal device, or may be a chip included in a terminal device.

The function of the communication apparatus may be implemented by hardware, or may be implemented by hardware executing corresponding software. The hardware or the software includes one or more modules, units, or means (means) corresponding to the function.

In a possible design, a structure of the communication apparatus includes a processing module and a transceiver module. The processing module is configured to support the apparatus in performing a corresponding function of the first access network device in the foregoing aspects, or performing a corresponding function of the second access network device in the foregoing aspects, or performing a corresponding function of the terminal device in the foregoing aspects. The transceiver module is configured to support communication between the communication apparatus and another communication device. For example, when the communication apparatus is a first access network device, first indication information may be sent to the first access network device. The communication apparatus may further include a storage module. The storage module is coupled to the processing module, and stores program instructions and data that are necessary for the communication apparatus. In an example, the processing module may be a processor, a communication module may be a transceiver, and the storage module may be a memory. The memory may be integrated with the processor, or may be disposed separately from the processor.

In another possible design, a structure of the communication apparatus includes a processor, and may further include a memory. The processor is coupled to the memory, and may be configured to execute computer program instructions stored in the memory, so that the communication apparatus performs the method in the foregoing aspects. Optionally, the communication apparatus further includes a communication interface, and the processor is coupled to the communication interface. When the communication apparatus is a terminal device or an access network device, the communication interface may be a transceiver or an input/ output interface. When the communication apparatus is a chip included in a terminal device or a chip included in an access network device, the communication interface may be an input/output interface of the chip. Optionally, the transceiver may be a transceiver circuit, and the input/output interface may be an input/output circuit.

According to a tenth aspect, an embodiment of this application provides a chip system, including a processor. The processor is coupled to a memory, the memory is configured to store a program or instructions, and when the program or the instructions are executed by the processor, the chip system is enabled to implement the method in the foregoing aspects.

Optionally, the chip system further includes an interface circuit, and the interface circuit is configured to exchange code instructions to the processor.

Optionally, there may be one or more processors in the chip system, and the processor may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may be one or more memories in the chip system. The memory may be integrated with the processor, or may be disposed separately from the processor. For example, the memory may be a non-transitory processor, for example, a read-only memory ROM. The memory and the processor may be integrated into a same chip, or may be separately disposed on different chips.

According to an eleventh aspect, an embodiment of this application provides a computer-readable storage medium. The computer-readable storage medium stores a computer program or instructions, and when the computer program or the instructions are executed, a communication apparatus is enabled to perform the method in any one of the foregoing aspects or the possible designs of the foregoing aspects.

According to a twelfth aspect, an embodiment of this application provides a computer program product. When a communication apparatus executes the computer program product, the communication apparatus is enabled to perform the method in any one of the foregoing aspects or the possible designs of the foregoing aspects.

According to a thirteenth aspect, an embodiment of this application provides a communication system. The communication system includes a first access network device, a second access network device, and a terminal device. Optionally, the communication system may further include a core network device.

DESCRIPTION OF EMBODIMENTS

To make objectives, technical solution, and advantages of embodiments of this application clearer, the following further describes embodiments of this application in detail with reference to the accompanying drawings.

The technical solutions in embodiments of this application may be applied to various communication systems such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a 5th generation (5th generation, 5G) communication system, a new radio (new radio, NR) system, a future communication system, or another similar communication system.

Figure 1:
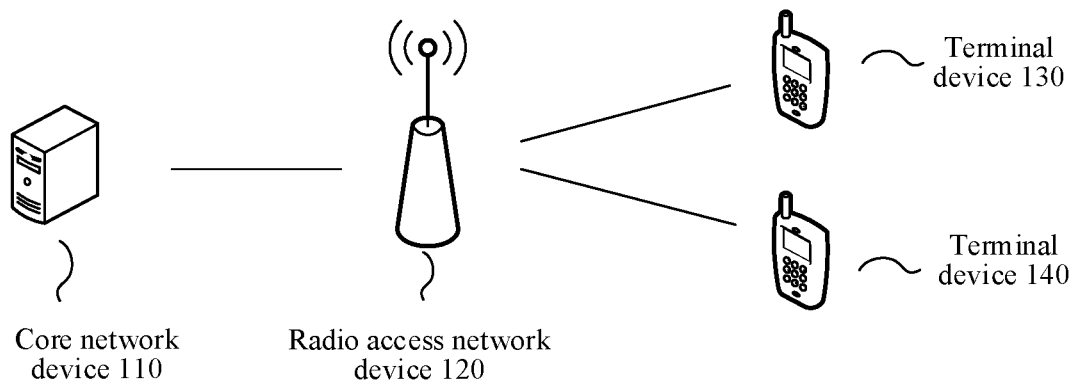
FIG. 1 is a schematic diagram of a network architecture of a communication system to which an embodiment of this application is applicable.

FIG. 1 is a schematic diagram of a network architecture of a communication system to which an embodiment of this application is applicable. The communication system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner.

The core network device and the radio access network device may be different independent physical devices, or functions of the core network device and logical functions of the radio access network device are integrated into a same physical device, or a part of functions of the core network device and a part of functions of the radio access network device are integrated into one physical device. The terminal device may be at a fixed location, or may be mobile.

It should be understood that FIG. 1 is merely a schematic diagram. The communication system may alternatively include another type of network device, for example, may alternatively include a wireless relay device and a wireless backhaul device, which are not shown in FIG. 1. None of quantities of core network devices, radio access network devices, and terminal devices that are included in the communication system is limited in embodiments of this application.

The terminal device in this application is a device having wireless sending and receiving functions, and is connected to a radio access network device in a wireless manner, to access a communication system. The terminal device may also be referred to as a terminal, user equipment (user equipment, UE), a mobile station, a mobile terminal, or the like. The terminal device may be a mobile phone, a tablet computer, a computer having wireless sending and receiving functions, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. Neither of a specific technology and a specific device form used for the terminal device is limited in embodiments of this application. By way of example rather than not limitation, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-sized devices that can implement complete or partial functions without depending on a smartphone, for example, a smartwatch or smart glasses, and devices that focus on only one type of application function and need to work with another device such as a smartphone, for example, various smart bands, smart helmets, or smart jewelry for monitoring physical signs. The terminal device may alternatively be a vehicle-mounted module, a vehicle-mounted component, a vehicle-mounted chip, or a vehicle-mounted unit that is built in a vehicle as one or more components or units. The vehicle may use the vehicle-mounted module, a vehicle-mounted module assembly, the vehicle-mounted component, the vehicle-mounted chip, or the vehicle-mounted unit that is built in the vehicle to implement the method in this application.

The radio access network device in this application is a device that is in a network and that is configured to connect a terminal device to a wireless network device. The radio access network device is a node in a radio access network, and may also be referred to as a base station, or may be referred to as a RAN node (or device). In this application, the radio access network device may be referred to as an access network device for short. Unless otherwise specified, all the following access network devices are radio access network devices. The radio access network device may be a base station (base station), an evolved NodeB (evolved NodeB, eNodeB) in an LTE system or an LTE-advanced (LTE-Advanced, LTE-A) system, a next generation NodeB (next generation NodeB, gNB) in a 5G communication system, a transmission reception point (transmission reception point, TRP), a baseband unit (base band unit, BBU), a Wi-Fi access point (access point, AP), a base station in a future mobile communication system, an access node in a Wi-Fi system, or the like. The radio access network device may alternatively be a module or a unit that completes some functions of a base station. For example, the radio access network device may be a central unit (central unit, CU) or a distributed unit (distributed unit, DU). Neither of a specific technology and a specific device form used for the radio access network device is limited in embodiments of this application.

In a separated deployment architecture in which the radio access network device includes a CU and a DU, one CU may be connected to one or more DUs, and there is a control plane interface between the CU and the DU. Specifically, the CU is configured to support protocols such as radio resource control (radio resource control, RRC), a packet data convergence protocol (packet data convergence protocol, PDCP), and a service data adaptation protocol (service data adaptation protocol, SDAP). The DU is configured to support a radio link control (radio link control, RLC) layer protocol, a medium access control (medium access control, MAC) layer protocol, and a physical layer protocol.

The radio access network device and the terminal device in embodiments of this application may be deployed on land, including an indoor or outdoor device, a handheld device, or a vehicle-mounted device; or may be deployed on a water surface; or may be deployed on a plane, a balloon, or an artificial satellite in the air. Application scenarios of the network device and the terminal device are not limited in embodiments of this application.

The radio access network device and the terminal device may communicate with each other by using a licensed spectrum, or may communicate with each other by using an unlicensed spectrum, or may communicate with each other by using both a licensed spectrum and an unlicensed spectrum. The radio access network device and the terminal device may communicate with each other by using a spectrum lower than 6 gigahertz (gigahertz, GHz), or may communicate with each other by using a spectrum higher than 6 GHz, or may communicate with each other by using both a spectrum lower than 6 GHz and a spectrum higher than 6 GHz. A spectrum resource used between the radio access network device and the terminal device is not limited in embodiments of this application.

Embodiments of this application may be applied to an NSA deployment manner. In the NSA deployment manner, a terminal device may be connected to two access network devices in a dual connectivity form. The two access network devices use different communication standards, but can be connected to a same core network. The communication standard may include, for example, a 4G network, a 5G network, or the like. This is not limited.

One of the two access network devices to which the terminal device is connected is a master access network device, and the other access network device is a secondary access network device. The master access network device may also be referred to as a master base station, a master node (master node, MN), or a master anchor (master anchor), or may be referred to as a master station for short.

The secondary access network device may also be referred to as a secondary base station, a secondary node (secondary node, SN), or a secondary anchor (secondary anchor), or may be referred to as a secondary station for short.

Figure 2:
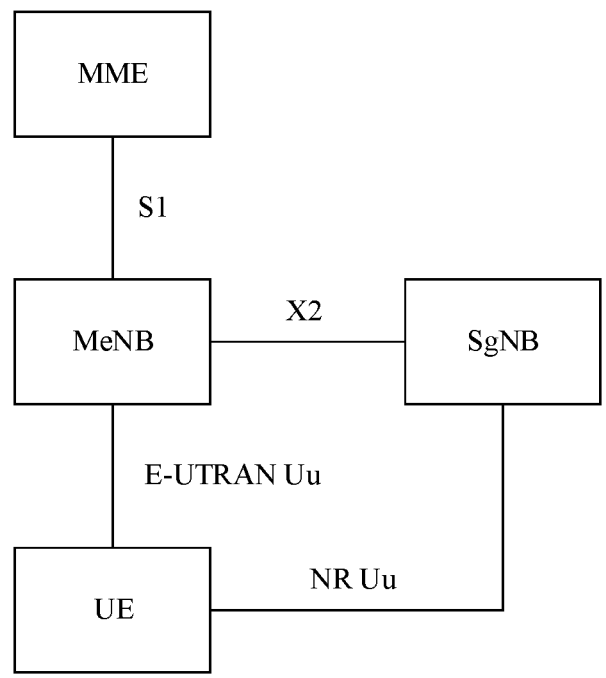
FIG. 2 is a schematic diagram of an NSA deployment manner to which an embodiment of this application is applicable.

FIG. 2 is a schematic diagram of an NSA deployment manner to which an embodiment of this application is applicable. The NSA deployment manner is specifically a dual connectivity mode in a case that a core network is an evolved packet core (evolved packet core, EPC), and may also be referred to as an evolved universal terrestrial radio access and new radio dual connectivity (E-UTRA NR dual connectivity, EN-DC) mode.

For example, as shown in FIG. 2, a master access network device is an evolved NodeB eNB in a 4G network, for example, an MeNB in the figure. A secondary access network device is a next generation NodeB gNB in a 5G network, for example, an SgNB in the figure. Both the MeNB and the SgNB are connected to a core network EPC in the 4G network, and the EPC provides a core network transmission resource for data transmission between UE and a network. For example, the MeNB may be connected to an MME in the EPC, and the SgNB may be connected to a serving gateway (serving gateway, SGW) of the EPC. In this scenario, an X2 interface exists between the MeNB and the SgNB, there is at least a control plane connection, and there may further be a user plane connection; an S1 interface exists between the MeNB and the EPC, there is at least a control plane connection, and there may further be a user plane connection; and an S1-U interface exists between the SgNB and the EPC, that is, there is only a user plane connection. The MeNB may provide an air interface resource for a terminal device through at least one cell, and the at least one cell is referred to as a master cell group (master cell group, MCG). Correspondingly, the SgNB may also provide an air interface resource for the terminal device through at least one cell, and the at least one cell is referred to as a secondary cell group (secondary cell group, SCG).

The MME is responsible for managing and storing a mobility management context of the UE (for example, an identifier of the UE, a mobility management status, and a user security parameter), and processing non-access stratum (non-access stratum, NAS) signaling (for example, an attach request (attach request), a location update request, a service request (service request), and a packet data network connectivity request (PDN connectivity request)), and is responsible for security of the NAS signaling and the like.

In embodiments of this application, that the terminal device supports user plane security protection has a plurality of types of descriptions based on objects and features. The objects may be: (1) an evolved packet core (evolved packet core, EPC); (2) an eNB; (3) long term evolution (long term evolution, LTE); (4) E-UTRA with EPC; and (5) EPC based Dual Connectivity of eUTRA and NR RAT. The features may be: (1) user plane integrity protection (user plane integrity protection, UPIP); (2) user plane encryption protection; and (3) on-demand user plane protection (that is, whether to enable user plane encryption protection and/or user plane integrity protection may be determined according to a user plane security policy).

For example, with reference to the object (1) and the feature (1), that the UE supports UPIP may be expressed as "the UE supports user plane integrity protection with the EPC". It should be noted that the object is optional. For example, with reference to the feature (1), that the UE supports UPIP may be expressed as "the UE supports user plane integrity protection". Subsequent similar descriptions of "supporting user plane security protection" may be replaced with a combination of the objects 1 to 5 and the features 1 to 3, or descriptions of the features 1 to 3.

It should be noted that the terms "system" and "network" may be used interchangeably in embodiments of this application. "A plurality of" means two or more. In view of this, "a plurality of" in embodiments of this application may also be understood as "at least two". "At least one" may be understood as one or more, for example, one, two, or more. For example, "including at least one" means including one, two, or more, and does not limit items that are included. For example, if at least one of A, B, and C is included, A, B, C, A and B, A and C, B and C, or A, B, and C may be included. Similarly, understanding of the description such as "at least one type" is similar. The term "and/or" describes an association relationship of associated objects, and indicates that three relationships may exist. For example, A and/or B may indicate the following three cases: Only A exists, both A and B exist, and only B exists. In addition, the character "/" generally indicates an "or" relationship between the associated objects, unless otherwise stated.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" do not necessarily indicate that objects are different.

This application is applied to an inter-system dual connectivity scenario. A terminal device may be connected to both a first access network device and a second access network device in a dual connectivity manner. The first access network device is a master access network device (which may also be referred to as a master station) connected to the terminal device, the second access network device is a secondary access network device (which may also be referred to as a secondary station) connected to the terminal device, and the first access network device and the second access network device use different communication standards.

In an existing secondary station addition procedure, because the communication standards of the master station and the secondary station are different, the master access network device in dual connectivity of the terminal device cannot transmit, to the secondary access network device, information about whether the terminal device supports user plane security protection. As a result, enablement of user plane security between the terminal device and the secondary access network device cannot be supported. For example, the first access network device is an evolved NodeB eNB (which may be denoted as an MeNB) in a 4G network, and the second access network device is a next generation NodeB gNB (which may be denoted as an SgNB) in a 5G network. The information about whether the terminal device supports user plane security protection is indicated by a specific bit of a UE EPS security capability. In the secondary station addition procedure, if the MeNB has a UE NR security capability, the MeNB may directly send the UE NR security capability to the SgNB, but not send the UE EPS security capability. However, the UE NR security capability cannot indicate whether the terminal device supports user plane security protection, for example, cannot indicate whether the terminal device supports UPIP. If the MeNB does not have a UE NR security capability, the MeNB may map the UE EPS security capability to the UE NR security capability. However, in a mapping process, because the specific bit of the UE EPS security capability is ignored during mapping, the information about whether the terminal device supports user plane security protection is also lost.

For the foregoing problem, this application provides a security activation method. The method is used to enable user plane security between a terminal device and a secondary station in an NSA deployment manner. The method may have four possible implementations. For ease of description, the four possible implementations are referred to as a solution 1 to a solution 4 in this application. The following separately describes in detail the solution 1 to the solution 4 in embodiments of this application.

Solution 1

Figure 3:
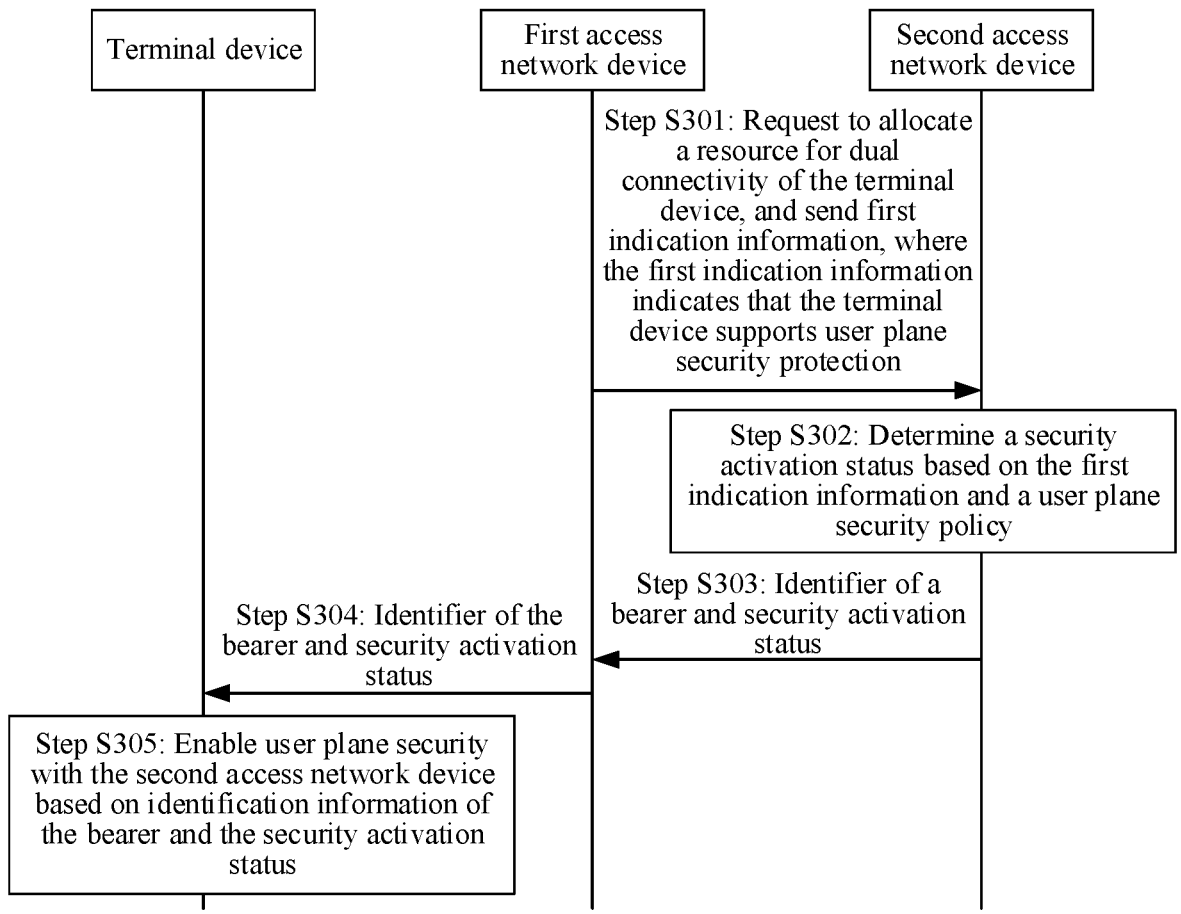
FIG. 3 is a schematic flowchart of a security activation method according to an embodiment of this application.

FIG. 3 is a schematic flowchart of a security activation method according to an embodiment of this application. The method includes the following steps.

Step S301: A first access network device in a first communication standard requests a second access network device in a second communication standard to allocate a resource for dual connectivity of a terminal device, and sends first indication information to the second access network device, where the first indication information indicates that the terminal device supports user plane security protection, the first access network device is a master access network device in the dual connectivity of the terminal device, and the second access network device is a secondary access network device in the dual connectivity of the terminal device.

Correspondingly, the second access network device accepts the request of the first access network device for allocating the resource for the dual connectivity of the terminal device, and receives the first indication information from the first access network device.

That the first access network device requests the second access network device to allocate the resource for the dual connectivity of the terminal device and sends the first indication information to the second access network device may be implemented by sending one message, for example, a secondary station addition request message, to the second access network device by the first access network device, or may be separately implemented by sending two messages. This is not limited in this application.

For example, the first communication standard may be a 4G network, which may also be referred to as a 4G system or an evolved packet system (evolved packet system, EPS). The second communication standard may be a 5G network, which may also be referred to as a 5G system or a new radio (new radio, NR) system. In this way, the first access network device may be an evolved NodeB eNB in the 4G network, and the second access network device may be a next generation NodeB gNB in the 5G network.

In this embodiment of this application, that the terminal device supports the user plane security protection may mean that the terminal device supports user plane encryption protection and/or user plane integrity protection, or the terminal device supports enablement of user plane encryption protection and/or user plane integrity protection. That the terminal device supports the user plane security protection may alternatively be understood as that the terminal device supports on-demand user plane security protection. That is, whether the terminal device enables user plane encryption protection and/or user plane integrity protection is not fixed, for example, may be determined based on a user plane security policy. Optionally, that the terminal device supports the on-demand user plane security protection may also be understood as that the terminal device supports enablement or enablement of the user plane encryption protection and/or the user plane integrity protection under an indication of an access network device. Similarly, that the terminal device does not support the user plane security protection may mean that the terminal device does not support user plane encryption protection and/or user plane integrity protection, or the terminal device does not support enablement of user plane encryption protection and/or user plane integrity protection.

The first access network device may generate the first indication information based on a context of the terminal device. In a possible implementation, the context of the terminal device includes a first security capability that is of the terminal device and that corresponds to the first communication standard. The first security capability indicates one or more security algorithms (for example, an encryption protection algorithm and/or an integrity protection algorithm) supported by the terminal device in the first communication standard, and may include information about whether the terminal device supports the user plane security protection. Therefore, the first access network device may determine, based on the first security capability, whether the terminal device supports the user plane security protection, and generate the first indication information if determining that the terminal device supports the user plane security protection.

For example, when the first communication standard is a 4G network, the first security capability may be an EPS security capability of the terminal device, and the EPS security capability indicates a security algorithm supported by the terminal device in the 4G network. The EPS security capability may include an EPS encryption algorithm (EPS encryption algorithm, EEA) 0 to an EEA 7 and an integrity algorithm (EPS integrity algorithm, EIA) 0 to an EIA 7, and the EIA 7 may indicate whether the terminal device supports user plane integrity protection. In this case, the first access network device may determine, based on an indication of the EIA 7 in the EPS security capability, whether the terminal device supports the user plane integrity protection. If determining that the terminal device supports the user plane integrity protection, the first access network device generates the first indication information, and sends the first indication information to the second access network device. It may be understood that when the EIA 7 in the EPS security capability indicates that the terminal device supports the user plane integrity protection, correspondingly, the first indication information may indicate that the terminal device supports the user plane integrity protection. Therefore, the first indication information may also be referred to as user plane integrity protection (user plane integrity protection, UPIP) indication information. Optionally, considering that the terminal device usually supports user plane encryption protection by default, when it is determined, based on the indication of the EIA 7 in the EPS security capability of the terminal device, that the terminal device supports the user plane integrity protection, it may be considered that the terminal device also supports the user plane encryption protection. In this case, the first indication information may indicate that the terminal device supports the user plane integrity protection and/or the user plane encryption protection.

In another possible implementation, the context of the terminal device includes a first wireless capability that is of the terminal device and that corresponds to the first communication standard. The first wireless capability indicates one or more wireless communication capabilities that are supported by the terminal device and that are used for the first communication standard, and may include information about whether the terminal device supports the user plane security protection. Therefore, the first access network device may determine, based on the first security capability, whether the terminal device supports the user plane security protection, and generate the first indication information if determining that the terminal device supports the user plane security protection.

For example, when the first communication standard is a 4G network, the first wireless capability may be an evolved universal terrestrial radio access network (evolved universal terrestrial radio access network, E-UTRAN) wireless capability of the terminal device, and the E-UTRAN wireless capability indicates a radio access capability supported by the terminal device in an E-UTRAN network. In this case, the first access network device may determine, based on whether the E-UTRAN wireless capability includes an indication indicating that the terminal device supports the user plane security protection, whether the terminal device supports user plane integrity protection. If determining that the terminal device supports the user plane integrity protection, the first access network device generates the first indication information, and sends the first indication information to the second access network device. It may be understood that when the E-UTRAN wireless capability includes the indication indicating that the terminal device supports the user plane security protection, correspondingly, the first indication information may indicate that the terminal device supports the user plane integrity protection. Therefore, the first indication information may also be referred to as user plane integrity protection (user plane integrity protection, UPIP) indication information. For example, when the first communication standard is a 4G network, the first wireless capability may alternatively be a multi-radio dual connectivity (multi-radio dual connectivity, MR-DC) wireless capability of the terminal device, and the multi-radio dual connectivity wireless capability indicates a radio access capability supported by the terminal device in a dual connectivity network with an E-UTRAN access standard. Particularly, the multi-radio dual connectivity wireless capability is transparent to the first access network device. In this case, that the first access network device may generate the first indication information based on the context of the terminal device may be understood as that when establishing dual connectivity, the first access network device sends the multi-radio dual connectivity wireless capability in the context of the terminal device to the second access network device. In this case, the generated first indication information is the multi-radio dual connectivity wireless capability. It may be understood that when the multi-radio dual connectivity wireless capability includes an indication indicating that the terminal device supports the user plane security protection, correspondingly, the first indication information may indicate that the terminal device supports the user plane integrity protection. Therefore, the first indication information may also be referred to as user plane integrity protection (user plane integrity protection, UPIP) indication information.

Optionally, in this embodiment of this application, the first access network device may further send a user plane security policy to the second access network device. The user plane security policy may be received by the first access network device from a core network device, or may be preconfigured in the first access network device. This is not limited in this application. The user plane security policy received by the first access network device from the core network device may be included in the context of the terminal device. The user plane security policy and the first indication information may be carried in a same message and sent to the second access network device, or may be sent to the second access network device by using different messages. This is not limited in this application.

The user plane security policy may include a user plane encryption protection policy and/or a user plane integrity protection policy. The user plane encryption protection policy indicates whether to enable user plane encryption protection, and the user plane integrity protection policy indicates whether to enable user plane integrity protection. The user plane encryption protection policy has three possible values: not needed, preferred, and required. The user plane integrity protection policy also has three possible values: not needed, preferred, and required. Herein, "not needed" indicates that enablement of protection is not needed, "preferred" indicates that enablement of protection is preferred or not, and "required" indicates that enablement of protection is required. The foregoing three possible values each may be indicated by using 2 bits. For example, 00 may indicate that enablement of protection is not needed, 01 may indicate that enablement of protection is preferred or not, and 11 may indicate that enablement of protection is required.

The first access network device may send the user plane security policy to the second access network device in the following two possible manners.

Manner 1: Only a user plane security policy received from the core network device is sent. If no user plane security policy is received from the core network device, a user plane security policy preconfigured in the first access network device is not sent either.

Manner 2: If a user plane security policy is received from the core network device, the user plane security policy received from the core network device is sent. If no user plane security policy is received from the core network device, a user plane security policy preconfigured in the first access network device is sent.

Figure 4:
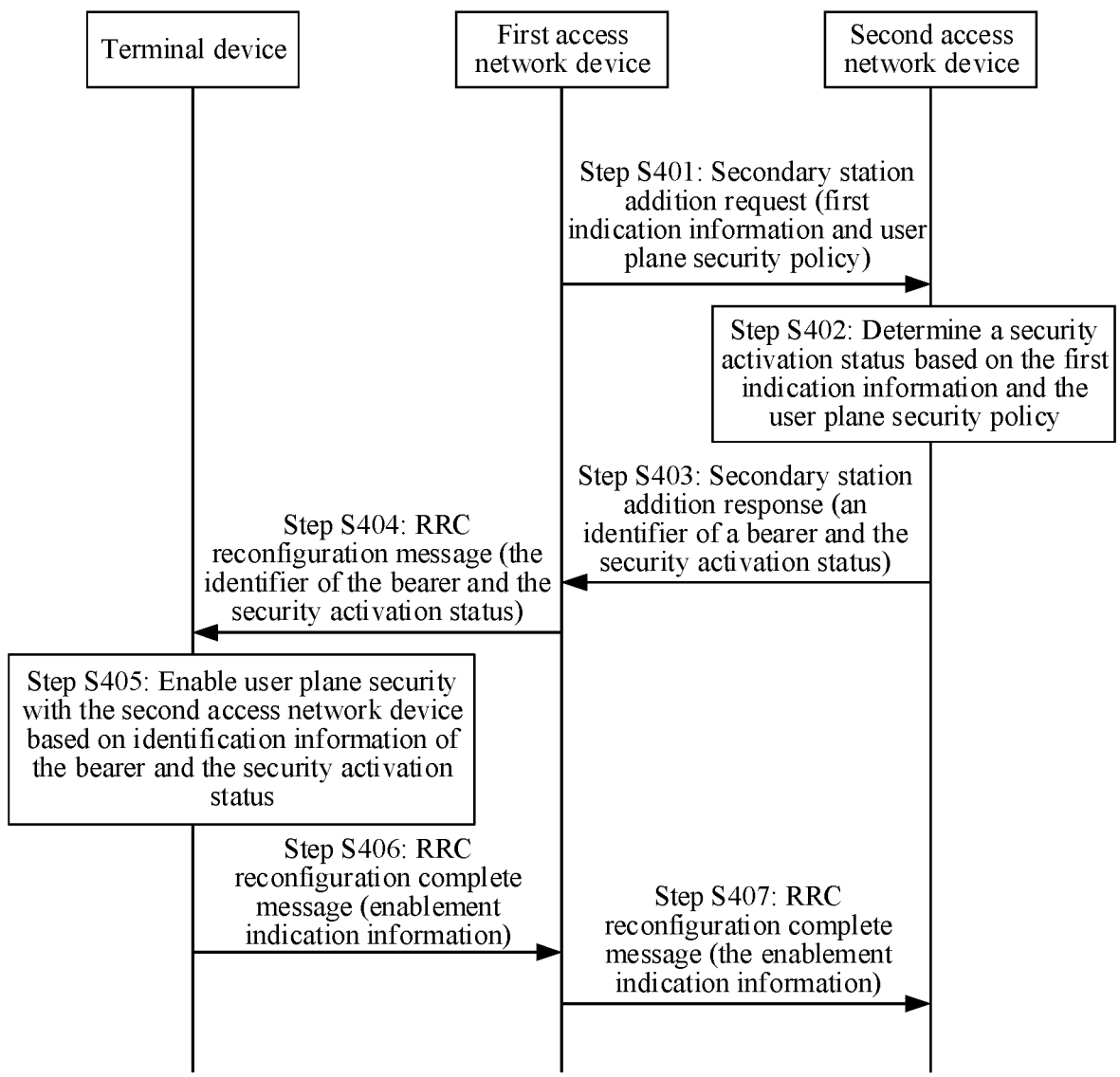
FIG. 4 shows a specific example of a security activation method according to an embodiment of this application.

FIG. 4 shows an example of a possible implementation of interaction between the first access network device and the second access network device. As shown in FIG. 4, in step S401, the first access network device may send a secondary station addition request to the second access network device, where the secondary station addition request is used to request to allocate the resource for the dual connectivity of the terminal device. The secondary station addition request includes the first indication information. Optionally, the secondary station addition request may further include the user plane security policy, and may further include a second security capability that is of the terminal device and that corresponds to the second communication standard, for example, an NR security capability of the terminal device. The secondary station addition request may be, for example, an SgNB addition request message, or may be another message. This is not limited in this application.

That the secondary station addition request is used to request to allocate the resource for the dual connectivity of the terminal device may also be understood as that the secondary station addition request is used to add the second access network device as the secondary access network device in the dual connectivity of the terminal device, and allocate the resource for the dual connectivity of the terminal device.

For example, the first indication information may be a new information element in the secondary station addition request. For example, an information element indicating the EPS security capability of the terminal device may be added to the secondary station addition request, and whether the terminal device supports user plane security is indicated by using the EIA 7 in the EPS security capability. For another example, an information element indicating the E-UTRAN wireless capability of the terminal device may be added to the secondary station addition request, and whether the terminal device supports user plane security is indicated based on whether the E-UTRAN wireless capability includes the indication indicating that the terminal device supports the user plane security protection. Alternatively, the first indication information may be indication information that is newly added to the secondary station addition request and that occupies 1 bit. When a value of the indication information is 1, it may indicate that the terminal device supports the user plane security protection. When a value of the indication information is 0, it may indicate that the terminal device does not support the user plane security protection. Alternatively, the first indication information may be encapsulated in an existing information element in the secondary station addition request, for example, an NR security capability of the terminal device. An NIA 7 in the NR security capability may indicate whether the terminal device supports the user plane security protection. The NIA 7 in the NR security capability may be obtained by the first access network device through mapping based on the EIA 7 in the EPS security capability. For another example, for an MR-DC wireless capability of the terminal device, whether the terminal device supports user plane security is indicated based on whether the MR-DC wireless capability includes the indication indicating that the terminal device supports the user plane security protection.

In this embodiment of this application, before the first access network device requests the second access network device to allocate the resource for the dual connectivity of the terminal device and sends the first indication information, the first access network device may further select, in the following two manners, the second access network device that can be used as the secondary access network device in the dual connectivity of the terminal device:

Manner 1: The first access network device selects the second access network device based on existing logic. Whether each access network device in the second communication standard supports the user plane security protection does not need to be preconfigured in the first access network device. Therefore, the first access network device may select a second access network device that supports the user plane security protection, or may select a second access network device that does not support the user plane security protection.

Optionally, based on the manner 1, the first access network device may further perform additional determining on the user plane integrity protection policy. For example, the secondary station addition request is an SgNB addition request message. If the user plane integrity protection policy indicates "required", the first access network device may set, in the SgNB addition request message, a newly added information element (for example, the first indication information and/or the user plane security policy) as criticality information (criticality information) whose type is reject IE, so that the second access network device rejects the current request when the second access network device does not identify the information element. If the user plane integrity protection policy indicates "not needed" or "preferred", the first access network device may set, in the SgNB addition request message, a newly added information element as criticality information whose type is ignore IE, so that the second access network device ignores the information element when the second access network device does not identify the information element, but a subsequent procedure is not affected.

Manner 2: Whether each access network device in the second communication standard supports the user plane security protection is preconfigured in the first access network device, for example, may be configured by using a network management system. In this way, the first access network device may select, based on the context of the terminal device, a second access network device that supports the user plane security protection. For example, the context of the terminal device includes the first security capability of the terminal device and the user plane security policy, and the first security capability corresponds to the first communication standard. The first access network device may select the second access network device based on the first security capability of the terminal device and the user plane security policy of the terminal device. Alternatively, the context of the terminal device includes the first wireless capability of the terminal device and the user plane security policy, and the first wireless capability corresponds to the first communication standard. The first access network device may select the second access network device based on the first wireless capability of the terminal device and the user plane security policy of the terminal device.

For example, the user plane security policy is the user plane integrity protection policy. If the terminal device supports the user plane integrity protection and the user plane integrity protection policy indicates "required", the first access network device may select a second access network device that supports the user plane integrity protection. If the second access network device that supports the user plane integrity protection cannot be selected, the first access network device cannot add/offload (offload) an E-UTRAN radio access bearer E-RAB corresponding to the user plane integrity protection policy to the second access network device. In another scenario, if the user plane integrity protection policy indicates "preferred" or "not needed", the first access network device may select a second access network device that does not support the user plane integrity protection.

In an example, the first access network device may determine, based on the first security capability (or the first wireless capability) of the terminal device and the user plane security policy, whether the selected second access network device supports the user plane security protection, and if the selected second access network device does not support the user plane security protection, change the second access network device that does not support the user plane security protection to a second access network device that supports the user plane security protection. For example, if the terminal device supports the user plane integrity protection, the user plane integrity protection policy indicates "required", and the first access network device determines that the selected second access network device does not support the user plane integrity protection, the first access network device reselects a second access network device that supports the user plane integrity protection.

Step S302: The second access network device determines a security activation status based on the first indication information and the user plane security policy.

In this embodiment of this application, the second access network device may determine, based on the first indication information, that the terminal device supports the user plane security protection, and then determine the security activation status based on the user plane security policy. The security activation status may be a security activation status corresponding to a bearer allocated to the terminal device, and the bearer is for transmission of user plane data between the terminal device and the second access network device.

Corresponding to the manner 1 in which the first access network device sends the user plane security policy, if the second access network device receives the user plane security policy from the first access network device, the second access network device may determine the security activation status based on the received user plane security policy and the first indication information when the terminal device supports the user plane security protection. If the second access network device receives no user plane security policy from the first access network device, when the terminal device supports the user plane security protection, the second access network device may determine the security activation status based on the first indication information and a user plane security policy preconfigured in the second access network device.

Corresponding to the manner 2 in which the first access network device sends the user plane security policy, the second access network device always can receive the user plane security policy from the first access network device, and the second access network device determines the security activation status based on the received user plane security policy and the first indication information when the terminal device supports the user plane security protection.

In other words, that the first access network device sends the user plane security policy to the second access network device is optional. To be specific, in different manners of sending the user plane security policy by the first access network device, if the first access network device receives no user plane security policy from the core network device, the first access network device may send the preconfigured user plane security policy, or may not send the preconfigured user plane security policy. Therefore, the user plane security policy used by the second access network device to determine the security activation status herein may be received by the second access network device from the first access network device, or may be preconfigured in the second access network device. This is not limited in this application.

The security activation status indicates whether to enable user plane encryption protection and/or user plane integrity protection of the bearer. Specifically, the security activation status may include an encryption activation state and an integrity protection state. If the user plane encryption protection policy indicates "required", the second access network device may determine that all encryption activation states of bearers corresponding to the second access network device are enabled. If the user plane encryption protection policy indicates "preferred", the second access network device may determine that an encryption activation state of a bearer corresponding to the second access network device may be enabled or disabled. The second access network device may determine, based on a local policy (for example, a running status of the second access network device, a control policy, or a regulation requirement), whether to enable the encryption activation state. If the user plane encryption protection policy indicates "not needed", the second access network device may determine that all encryption activation states of bearers corresponding to the second access network device are disabled.

If the user plane integrity protection policy indicates "required", the second access network device may determine that all integrity protection activation states of bearers corresponding to the second access network device are enabled. If the user plane integrity protection policy indicates "preferred", the second access network device may determine that an integrity protection activation state of a bearer corresponding to the second access network device may be enabled or disabled. The second access network device may determine, based on a local policy (for example, a running status of the second access network device, a control policy, or a regulation requirement), whether to enable the integrity protection activation state. If the user plane integrity protection policy indicates "not needed", the second access network device may determine that all integrity protection activation states of bearers corresponding to the second access network device are disabled.

Further, the second access network device may enable user plane security with the terminal device based on the determined security activation status, that is, enable the user plane encryption protection and/or the user plane integrity protection of the bearer. The second access network device may immediately enable the user plane security with the terminal device after determining the security activation status, or may enable the user plane security with the terminal device after receiving enablement indication information from the terminal device. This is not limited in this application.

In other words, if determining, based on the first indication information, that the terminal device supports the user plane security protection, the second access network device enables user plane security protection of the bearer based on the user plane security policy. For example, if determining, based on the first indication information, that the terminal device supports the user plane integrity protection, the second access network device enables user plane integrity protection of a data radio bearer (data radio bearer, DRB) based on the user plane integrity protection policy. Optionally, user plane integrity protection of each DRB is enabled.

The "enable" may also be understood as a meaning of "activate", and the following descriptions about "enabling user plane security" may also be replaced with "activating user plane security".

Step S303: The second access network device sends identification information of the bearer and the security activation status to the first access network device.

Correspondingly, the first access network device receives the identification information of the bearer and the security activation status from the second access network device.

The identification information of the bearer may be a DRB identifier (drb-identity), an EPS bearer identifier (EPS-BearerIdentity), or the like. This is not limited.

For example, as shown in FIG. 4, in step S402, the second access network device may determine the security activation status based on the first indication information and the user plane security policy. Optionally, in this case, the second access network device may enable user plane security with the terminal device based on the security activation status. Further, in step S403, the second access network device may send a secondary station addition response to the first access network device, to indicate that the second access network device completes preparation for adding a secondary station. The secondary station addition response includes the identification information of the bearer and the security activation status. The secondary station addition response may be, for example, an SgNB addition request ACK message, an SgNB addition response message, or another message. This is not limited in this application.

Optionally, the secondary station addition response may carry an NR RRC reconfiguration message, the NR RRC reconfiguration message is transparent to the first access network device, and the NR RRC reconfiguration message carries the identification information of the bearer and the security activation status.

Optionally, the secondary station addition response may carry an enablement support indication, and the enablement support indication indicates that the second access network device supports the user plane security protection or the second access network device enables user plane security based on the user plane security policy. After receiving the secondary station addition response, the first access network device performs additional determining based on the enablement support indication. For example, if the current user plane integrity protection policy indicates "required", but the first access network device receives no enablement support indication, the first access network device may trigger a secondary station release procedure, for example, an SgNB release procedure, to indicate the second access network device to release the resource allocated for the dual connectivity of the terminal device. Optionally, the first access network device reselects a second access network device. If the current user plane integrity protection policy indicates "required", but the first access network device receives the enablement support indication, or the current user plane integrity protection policy indicates "preferred" or "not needed", the first access network device may continue to perform the following steps.

Step S304: The first access network device sends the identification information of the bearer and the security activation status to the terminal device.

Correspondingly, the terminal device receives the identification information of the bearer and the security activation status from the first access network device.

For example, as shown in FIG. 4, in step S404, the first access network device may send an RRC reconfiguration message to the terminal device, where the RRC reconfiguration message includes the identification information of the bearer and the security activation status. Optionally, the RRC reconfiguration message includes an NR RRC reconfiguration message transparently transmitted by the first access network device, and the NR RRC reconfiguration message carries the identification information of the bearer and the security activation status.

Step S305: The terminal device enables user plane security with the second access network device based on the identification information of the bearer and the security activation status, that is, enables the user plane encryption protection and/or the user plane integrity protection of the bearer.

Optionally, after enabling the user plane security with the second access network device, the terminal device may send enablement indication information to the first access network device, and then the first access network device sends the enablement indication information to the second access network device. The enablement indication information indicates that the terminal device has enabled the user plane security with the second access network device. In this case, if the second access network device does not enable the user plane security with the terminal device after determining the security activation status, the second access network device may enable the user plane security with the terminal device based on the enablement indication information after receiving the enablement indication information.

For example, as shown in FIG. 4, in step S405, the terminal device may configure the second access network device as the secondary access network device in the dual connectivity based on the received RRC reconfiguration message, and enable the user plane security with the second access network device based on an identifier of the bearer and the security activation status. Further, in step S406, the terminal device may send an RRC reconfiguration complete message to the first access network device, where the RRC reconfiguration complete message carries an NR RRC response message, and the NR RRC response message is transparent to the first access network device. Optionally, the NR RRC response message includes the enablement indication information, to indicate that the terminal device has enabled the user plane security with the second access network device. In step S407, the first access network device may send an RRC reconfiguration complete message to the second access network device, where the RRC reconfiguration complete message includes the NR RRC response message transparently transmitted by the first access network device. After receiving the NR RRC response message, the second access network device may determine that the terminal device completes a dual connectivity related configuration.

In the foregoing technical solution, processing logic of the first access network device used as the master access network device and the second access network device used as the secondary access network device in a secondary station addition procedure in an inter-system dual connectivity scenario is enhanced. The first access network device may send, to the second access network device, the first indication information indicating that the terminal device supports the user plane security protection, or further send the user plane security policy. The second access network device determines the security activation status based on the first indication information and the user plane security policy, and sends the security activation status to the terminal device. In this way, on-demand enablement of user plane security between the terminal device and the second access network device is implemented. In addition, the first access network device may further determine, based on the user plane integrity protection policy, whether the second access network device supports the user plane security protection, to avoid a problem that when the user plane integrity protection policy indicates "enabling", the second access network device ignores the user plane integrity protection policy because the second access network device does not support the user plane security protection, and consequently security is reduced.

Solution 2

Figure 5:
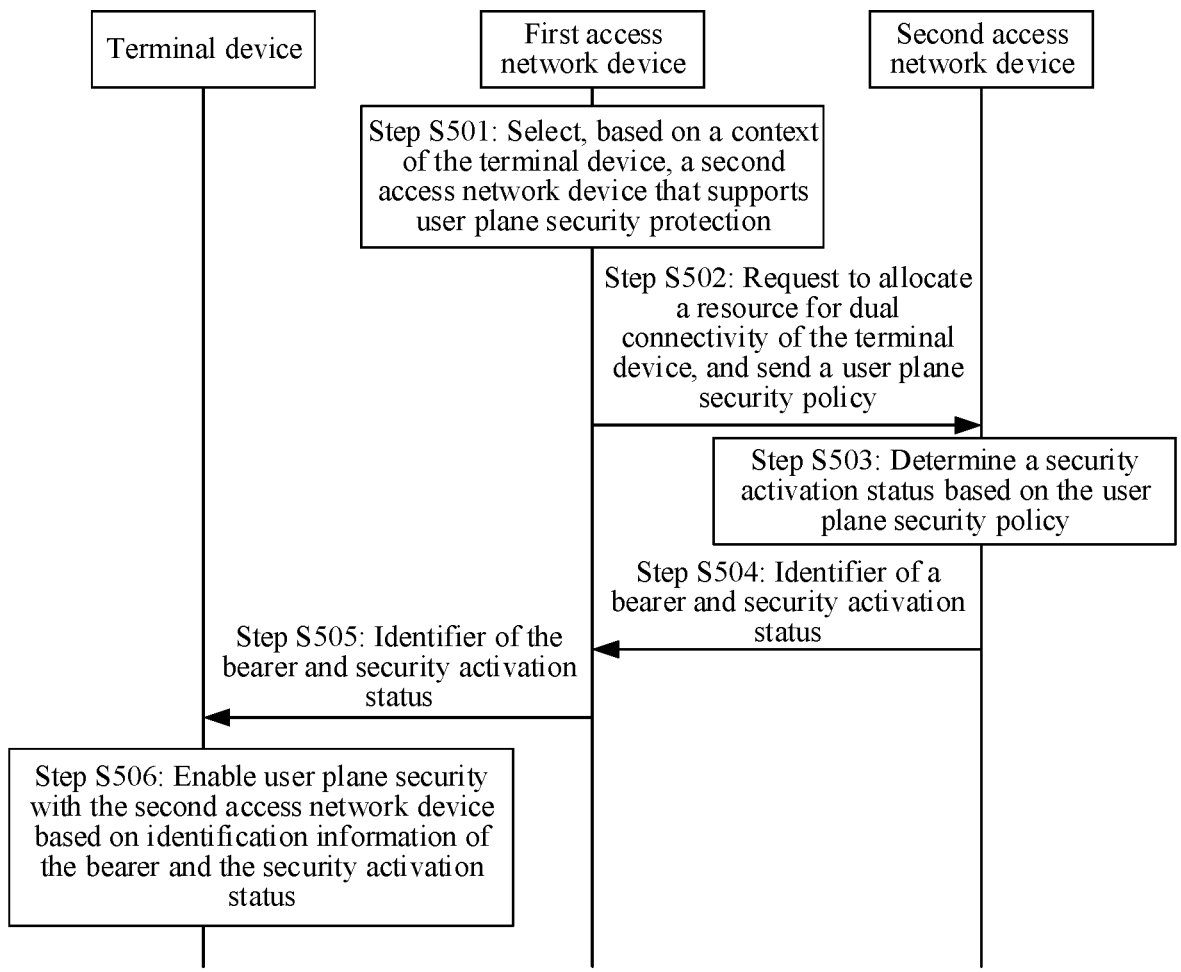
FIG. 5 is a schematic flowchart of another security activation method according to an embodiment of this application.

FIG. 5 is a schematic flowchart of a security activation method according to an embodiment of this application. The method includes the following steps.

Step S501: A first access network device in a first communication standard selects, based on a context of a terminal device, a second access network device that is in a second communication standard and that supports user plane security protection.

The first access network device is a master access network device in dual connectivity of the terminal device, and the second access network device is a secondary access network device in the dual connectivity of the terminal device.

In a possible implementation, the context of the terminal device includes a first security capability of the terminal device and a user plane security policy, and the first security capability corresponds to the first communication standard. In this way, after determining, based on the first security capability of the terminal device, that the terminal device supports the user plane security protection, the first access network device may further select the second access network device based on a user plane integrity protection policy.

In another possible implementation, the context of the terminal device includes a first wireless capability of the terminal device and a user plane security policy, and the first wireless capability corresponds to the first communication standard. In this way, after determining, based on the first wireless capability of the terminal device, that the terminal device supports the user plane security protection, the first access network device may further select the second access network device based on a user plane integrity protection policy.

Figure 6:
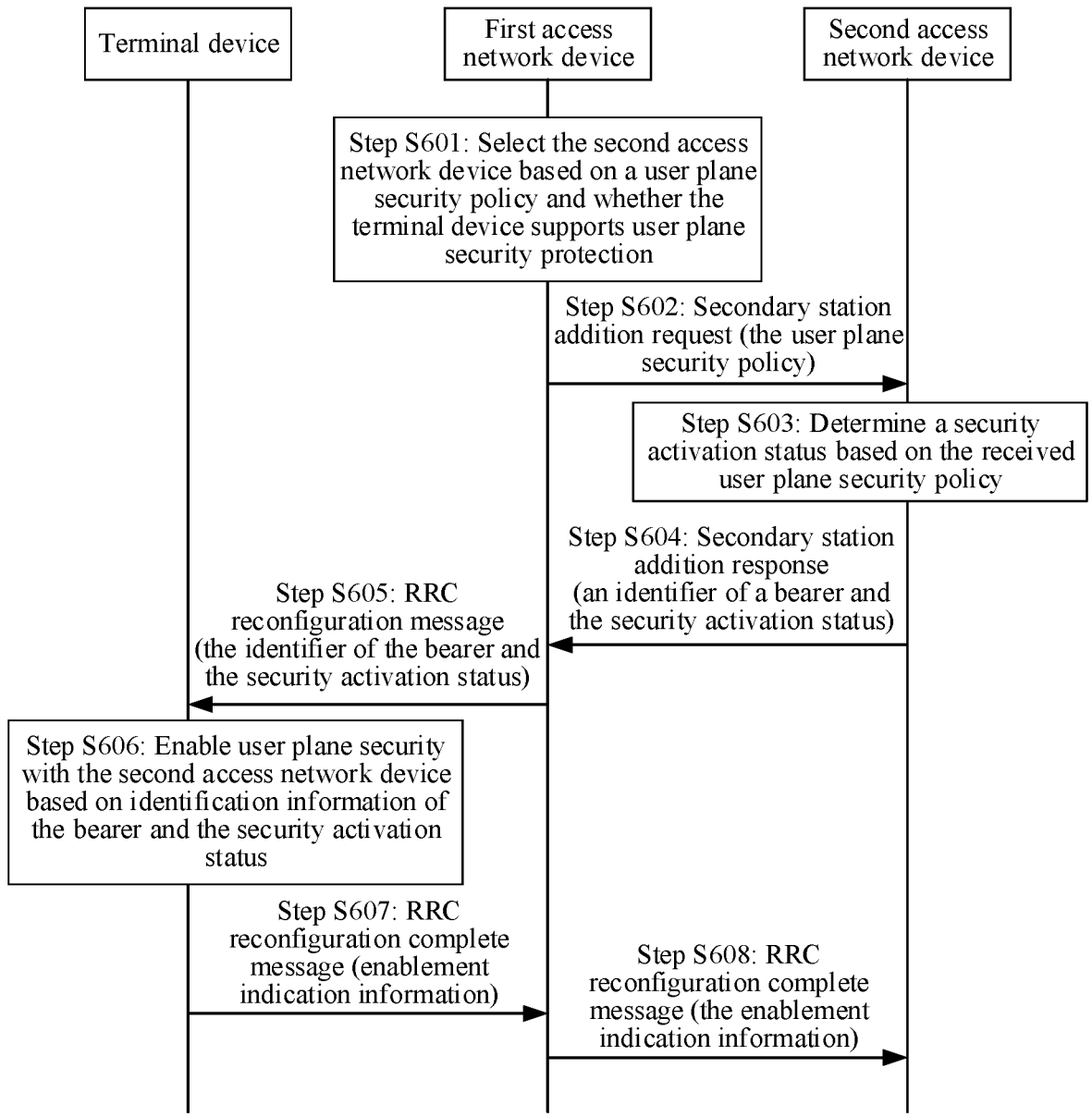
FIG. 6 shows a specific example of another security activation method according to an embodiment of this application.

For example, as shown in FIG. 6, in step S601, the first access network device may select the second access network device based on the user plane security policy and whether the terminal device supports the user plane security protection.

For example, the user plane security policy is a user plane integrity protection policy. If the terminal device supports the user plane security protection, and the user plane integrity protection policy in the user plane security policy indicates "required", the first access network device may select a second access network device that supports the user plane security protection (for example, a capability about whether each access network device in the second communication standard supports user plane security protection may be preconfigured in the first access network device by using a network management system), and send the user plane security policy to the second access network device. If the second access network device that supports the user plane security protection cannot be selected, the first access network device cannot add/offload (offload) an E-RAB corresponding to the user plane integrity protection policy to the second access network device.

If the terminal device supports the user plane security protection, and the user plane integrity protection policy in the user plane security policy indicates "preferred/not needed", the first access network device may preferentially select a second access network device that supports the user plane security protection, and send the user plane security policy to the second access network device. If the second access network device that supports the user plane security protection cannot be selected, the first access network device may alternatively select a second access network device that does not support the user plane security protection, and add/offload (offload) an E-RAB corresponding to the user plane integrity protection policy to the second access network device.

If the terminal device does not support the user plane security protection, and the user plane integrity protection policy in the user plane security policy indicates "preferred/not needed", the first access network device selects a second access network device based on existing logic, and does not send the user plane security policy to the second access network device.

In an example, the first access network device may determine, based on the first security capability (or the first wireless capability) of the terminal device and the user plane security policy, whether the selected second access network device supports the user plane security protection, and if the selected second access network device does not support the user plane security protection, change the second access network device that does not support the user plane security protection to a second access network device that supports the user plane security protection. For example, if the terminal device supports the user plane integrity protection, the user plane integrity protection policy indicates "required", and the first access network device determines that the selected second access network device does not support the user plane integrity protection, the first access network device reselects a second access network device that supports the user plane integrity protection.

Step S502: The first access network device requests the second access network device to allocate a resource for the dual connectivity of the terminal device, and sends the user plane security policy to the second access network device.

Correspondingly, the second access network device accepts the request of the first access network device for allocating the resource for the dual connectivity of the terminal device, and receives the user plane security policy from the first access network device.

That the first access network device requests the second access network device to allocate the resource for the dual connectivity of the terminal device and sends the user plane security policy to the second access network device may be implemented by sending one message, for example, a secondary station addition request message, to the second access network device by the first access network device, or may be separately implemented by sending two messages. This is not limited in this application.

The user plane security policy may be obtained in two manners. If the first access network device receives a user plane security policy from a core network device, the first access network device may send the user plane security policy received from the core network device. If the first access network device receives no user plane security policy from a core network device, but the terminal device supports the user plane integrity protection, the first access network device may send a preconfigured user plane security policy.

For example, as shown in FIG. 6, in step S602, the first access network device may send a secondary station addition request to the second access network device, where the secondary station addition request is used to request to allocate the resource for the dual connectivity of the terminal device. The secondary station addition request includes the user plane security policy. The user plane security policy may be received by the first access network device from the core network device, or may be preconfigured in the first access network device. This is not limited. Further, the secondary station addition request may include a second security capability that is of the terminal device and that corresponds to the second communication standard, for example, an NR security capability of the terminal device. The secondary station addition request may be, for example, an SgNB addition request message, or may be another message. This is not limited in this application.

Step S503: The second access network device determines a security activation status based on the user plane security policy.

In this embodiment of this application, the second access network device determines the security activation status based on the user plane security policy received from the first access network device. The security activation status may be a security activation status corresponding to a bearer allocated to the terminal device, and the bearer is for transmission of user plane data between the terminal device and the second access network device.

The security activation status indicates whether to enable user plane encryption protection and/or user plane integrity protection of the bearer. For specific content, refer to related descriptions in step S302.

Further, the second access network device may enable user plane security with the terminal device based on the determined security activation status, that is, enable the user plane encryption protection and/or the user plane integrity protection of the bearer. The second access network device may immediately enable the user plane security with the terminal device after determining the security activation status, or may enable the user plane security with the terminal device after receiving enablement indication information from the terminal device. This is not limited in this application.

In other words, the second access network device enables user plane security protection of the bearer based on the user plane security policy. For example, the second access network device enables user plane integrity protection of a DRB when the user plane integrity protection policy indicates "required". Optionally, user plane integrity protection of each DRB is enabled.

Step S504: The second access network device sends identification information of the bearer and the security activation status to the first access network device, where the security activation status indicates whether to enable the user plane encryption protection and/or the user plane integrity protection of the bearer.

Correspondingly, the first access network device receives the identification information of the bearer and the security activation status from the second access network device.

The identification information of the bearer may be a DRB identifier (drb-identity), an EPS bearer identifier (EPS-BearerIdentity), or the like. This is not limited.

For example, as shown in FIG. 6, in step S603, the second access network device may determine the security activation status based on the user plane security policy received from the first access network device. Optionally, in this case, the second access network device may enable user plane security with the terminal device based on the security activation status. Further, in step S604, the second access network device may send a secondary station addition response to the first access network device, to indicate that the second access network device completes preparation for adding a secondary station. The secondary station addition response includes the identification information of the bearer and the security activation status. The secondary station addition response may be, for example, an SgNB addition request ACK message, an SgNB addition response message, or another message. This is not limited in this application.

Optionally, the secondary station addition response may include an NR RRC reconfiguration message, the NR RRC reconfiguration message is transparent to the first access network device, and the NR RRC reconfiguration message carries the identification information of the bearer and the security activation status.

Optionally, the secondary station addition response may carry an enablement support indication, and after receiving the secondary station addition response, the first access network device performs additional determining based on the enablement support indication. For example, if the current user plane integrity protection policy indicates "required", but the first access network device receives no enablement support indication, the first access network device may trigger a secondary station release procedure, for example, an SgNB release procedure, to indicate the second access network device to release the resource allocated for the dual connectivity of the terminal device. Optionally, the first access network device reselects a second access network device. If the current user plane integrity protection policy indicates "required", but the first access network device receives the enablement support indication, or the current user plane integrity protection policy indicates "preferred" or "not needed", the first access network device may continue to perform the following steps.

Step S505: The first access network device sends the identification information of the bearer and the security activation status to the terminal device.

Correspondingly, the terminal device receives the identification information of the bearer and the security activation status from the first access network device.

For example, as shown in FIG. 6, in step S605, the first access network device may send an RRC reconfiguration message to the terminal device, where the RRC reconfiguration message includes the identification information of the bearer and the security activation status. Optionally, the RRC reconfiguration message includes an NR RRC reconfiguration message transparently transmitted by the first access network device, and the NR RRC reconfiguration message carries the identification information of the bearer and the security activation status.

Step S506: The terminal device enables user plane security with the second access network device based on the identification information of the bearer and the security activation status, that is, enables the user plane encryption protection and/or the user plane integrity protection of the bearer.

Optionally, after enabling the user plane security with the second access network device, the terminal device may send enablement indication information to the first access network device, and then the first access network device sends the enablement indication information to the second access network device. The enablement indication information indicates that the terminal device has enabled the user plane security with the second access network device. In this case, if the second access network device does not enable the user plane security with the terminal device after determining the security activation status, the second access network device may enable the user plane security with the terminal device based on the enablement indication information after receiving the enablement indication information.

For example, as shown in FIG. 6, in step S606, the terminal device may configure the second access network device as the secondary access network device in the dual connectivity based on the received RRC reconfiguration message, and enable the user plane security with the second access network device based on the identification information of the bearer and the security activation status. Further, in step S607, the terminal device may send an RRC reconfiguration complete message to the first access network device, where the RRC reconfiguration complete message includes an NR RRC response message, and the NR RRC response message is transparent to the first access network device. Optionally, the NR RRC response message carries the enablement indication information, to indicate that the terminal device has enabled the user plane security with the second access network device. In step S608, the first access network device may send an RRC reconfiguration complete message to the second access network device, where the RRC reconfiguration complete message includes the NR RRC response message transparently transmitted by the first access network device. After receiving the NR RRC response message, the second access network device may determine that the terminal device completes a dual connectivity related configuration.

In the foregoing technical solution, processing logic of the first access network device used as the master access network device and the second access network device used as the secondary access network device in a secondary station addition procedure in an inter-system dual connectivity scenario is enhanced. The first access network device determines whether the terminal device supports the user plane security protection. If the terminal device supports the user plane security protection, the first access network device selects, based on the user plane security policy, the second access network device that supports the user plane security protection, and sends the user plane security policy to the second access network device. The second access network device determines the security activation status based on the user plane security policy, and sends the security activation status to the terminal device. In this way, on-demand enablement of user plane security between the terminal device and the second access network device is implemented.

Solution 3

Figure 7:
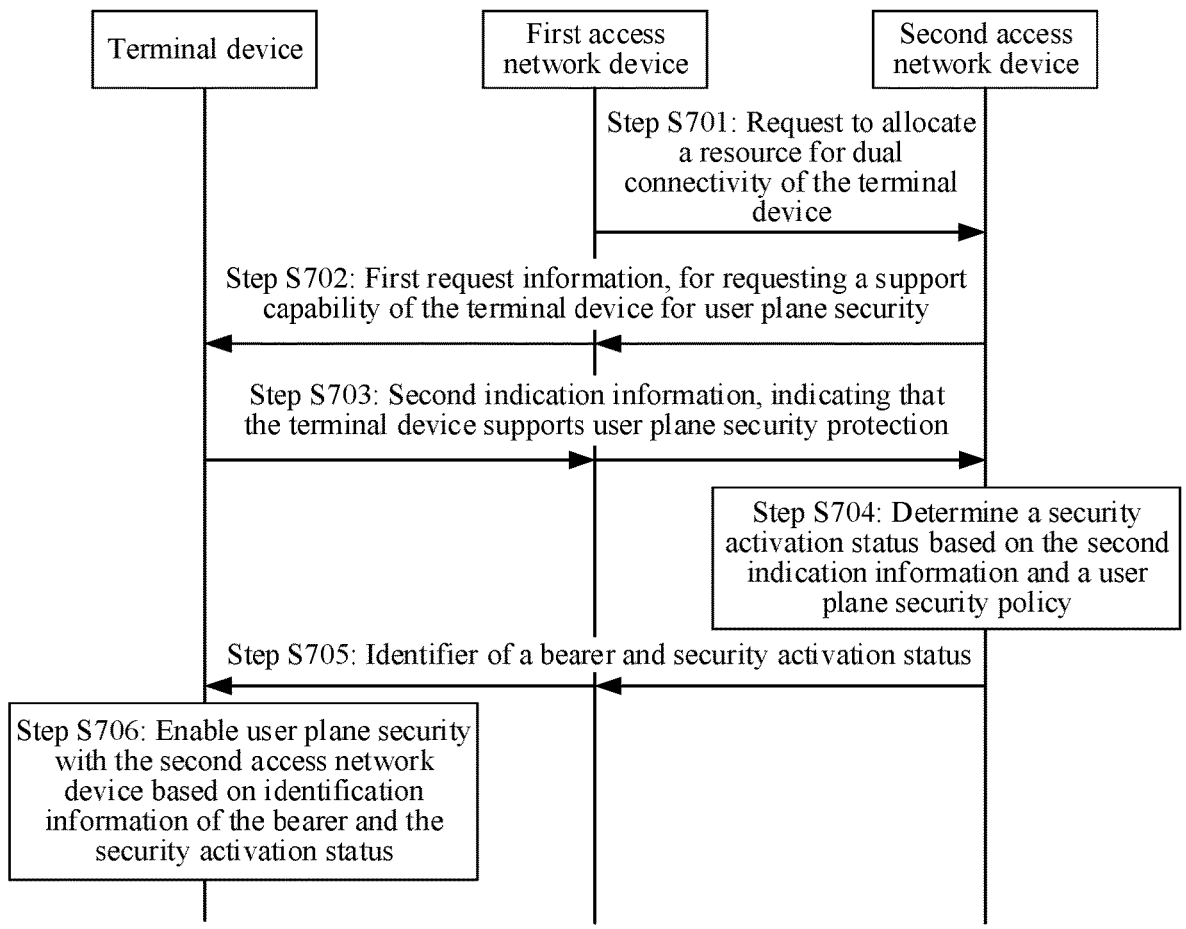
FIG. 7 is a schematic flowchart of another security activation method according to an embodiment of this application.

FIG. 7 is a schematic flowchart of a security activation method according to an embodiment of this application. The method includes the following steps.

Step S701: A first access network device in a first communication standard requests a second access network device in a second communication standard to allocate a resource for dual connectivity of a terminal device, where the first access network device is a master access network device in the dual connectivity of the terminal device, and the second access network device is a secondary access network device in the dual connectivity of the terminal device.

Correspondingly, the second access network device accepts the request of the first access network device for allocating the resource for the dual connectivity of the terminal device.

Figure 8:
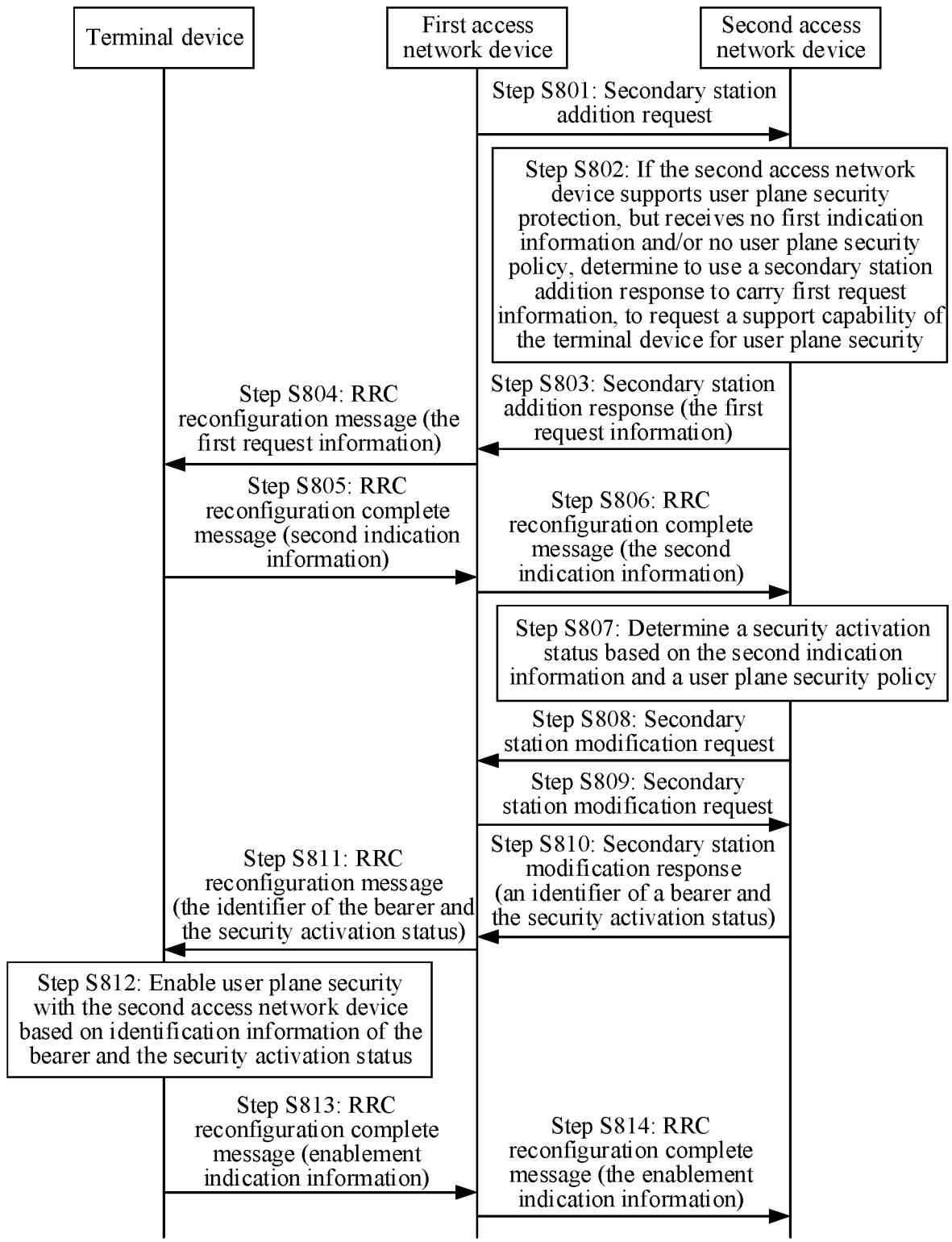
FIG. 8 shows a specific example of another security activation method according to an embodiment of this application.

For example, as shown in FIG. 8, if processing logic of the first access network device is not enhanced, the first access network device may not support user plane security protection. In this case, even if a first security capability (for example, a UE EPS security capability) or a first wireless capability (for example, a UE E-UTRAN wireless capability) that is of the terminal device and that corresponds to the first communication standard indicates that the terminal device supports the user plane security protection, the first access network device cannot transmit first indication information to the second access network device in a secondary station addition procedure, and a user plane security policy may be lost. In step S801, if the first access network device determines to request the second access network device to allocate a resource for a specific E-RAB, the first access network device may initiate the secondary station addition procedure, and send a secondary station addition request to the second access network device, where the secondary station addition request is used to request to allocate the resource for the dual connectivity of the terminal device. The secondary station addition request may include a second security capability that is of the terminal device and that corresponds to the second communication standard, for example, an NR security capability of the terminal device. It should be noted that the secondary station addition request includes neither of the first indication information and the user plane security policy that are mentioned above. The secondary station addition procedure may be an SgNB addition procedure, and the secondary station addition request may be an SgNB addition request message, or may be another message. This is not limited in this application.

Step S702: The second access network device sends first request information to the terminal device through the first access network device, where the first request information is used to request a support capability of the terminal device for user plane security.

Correspondingly, the terminal device receives the first request information from the second access network device through the first access network device.

For example, as shown in FIG. 8, after the second access network device receives the secondary station addition request from the first access network device, in step S802, if the second access network device supports the user plane security protection, but the second access network device receives no first indication information and/or no user plane security policy, the second access network device determines to include the first request information in a secondary station addition response, where the first request information is used to request the support capability of the terminal device for the user plane security. The first request information may also be referred to as a UPIP request indication, and is used to request whether the terminal device supports the user plane security protection. The second access network device may further allocate the resource for the requested E-RAB based on the received secondary station addition request, and construct an NR RRC reconfiguration message. In step S803, the second access network device may send the secondary station addition response to the first access network device, where the secondary station addition response includes the first request information. The secondary station addition response may be an SgNB addition request ACK message or an SgNB addition response message, or may be another message. This is not limited in this application. Optionally, the secondary station addition response may include the NR RRC reconfiguration message, the NR RRC reconfiguration message is transparent to the first access network device, and the NR RRC reconfiguration message carries the first request information (that is, the UPIP request indication). In step S804, the first access network device may send an RRC reconfiguration message to the terminal device, where the RRC reconfiguration message includes the first request information (that is, the UPIP request indication). Optionally, the RRC reconfiguration message may include the transparently transmitted NR RRC reconfiguration message, and the NR RRC reconfiguration message carries the first request information (that is, the UPIP request indication).

Step S703: The terminal device sends second indication information to the second access network device through the first access network device, where the second indication information indicates that the terminal device supports the user plane security protection.

Correspondingly, the second access network device receives the second indication information from the terminal device through the first access network device.

For example, as shown in FIG. 8, after the terminal device receives the RRC reconfiguration message from the first access network device, if the terminal device supports the user plane security protection, the terminal device may send the second indication information to the second access network device based on an indication of the first request information in the RRC reconfiguration message. The second indication information indicates that the terminal device supports the user plane security protection, and the second indication information may be 1 bit. Specifically, in step S805, the terminal device may send an RRC reconfiguration complete message to the first access network device, where the RRC reconfiguration complete message includes the second indication information. Optionally, the RRC reconfiguration complete message includes an NR RRC response message, the NR RRC response message is transparent to the first access network device, and the NR RRC response message carries the second indication information. Further, in step S806, the first access network device may send another RRC reconfiguration complete message to the second access network device, where the RRC reconfiguration complete message includes the second indication information. Optionally, the RRC reconfiguration complete message may include the transparently transmitted NR RRC response message, and the NR RRC response message carries the second indication information.

Step S704: The second access network device determines a security activation status based on the second indication information and the user plane security policy.

In this embodiment of this application, the second access network device may determine, based on the second indication information, that the terminal device supports the user plane security protection, and then determine the security activation status based on the user plane security policy. The user plane security policy is preconfigured in the second access network device, or may be referred to as a default user plane security policy. The security activation status may be a security activation status corresponding to a bearer allocated to the terminal device, and the bearer is for transmission of user plane data between the terminal device and the second access network device.

The security activation status indicates whether to enable user plane encryption protection and/or user plane integrity protection of the bearer. For specific content, refer to related descriptions in step S302.

Further, the second access network device may enable user plane security with the terminal device based on the determined security activation status, that is, enable the user plane encryption protection and/or the user plane integrity protection of the bearer. The second access network device may immediately enable the user plane security with the terminal device after determining the security activation status, or may enable the user plane security with the terminal device after receiving enablement indication information from the terminal device. This is not limited in this application.

In other words, if determining, based on the second indication information, that the terminal device supports the user plane security protection, the second access network device enables user plane security protection of the bearer based on the user plane security policy. For example, if determining, based on the second indication information, that the terminal device supports the user plane integrity protection, the second access network device enables user plane integrity protection of a data radio bearer (data radio bearer, DRB) based on the user plane integrity protection policy. Optionally, user plane integrity protection of each DRB is enabled.

Step S705: The second access network device sends identification information of the bearer and the security activation status to the terminal device through the first access network device, where the security activation status indicates whether to enable the user plane encryption protection and/or the user plane integrity protection of the bearer.

Correspondingly, the terminal device receives the identification information of the bearer and the security activation status from the second access network device through the first access network device.

The identification information of the bearer may be a data radio bearer (data radio bearer, DRB) identifier (drb-identity), an EPS bearer identifier (EPS-BearerIdentity), or the like. This is not limited.

For example, as shown in FIG. 8, in step S807, the second access network device determines the security activation status based on the second indication information and a preconfigured user plane security policy. Optionally, in this case, the second access network device may enable user plane security with the terminal device based on the security activation status. Because the security activation status with the UE needs to be updated, in step S808, the second access network device may trigger a secondary station modification procedure (for example, an SgNB modification procedure). The second access network device may send a secondary station modification request to the first access network device, to request the first access network device to modify the resource allocated by the second access network device to the UE. The secondary station modification request may be an SgNB modification required message, or may be another message. This is not limited in this application. In step S809, the first access network device sends a secondary station modification request to the second access network device, to request the second access network device to prepare for modifying the resource allocated to the UE. The secondary station modification request may be an SgNB modification request message, or may be another message. This is not limited. In step S810, the second access network device may send a secondary station modification response to the first access network device, to confirm, with the first access network device, that the resource allocated to the UE is modified. The secondary station modification response includes the identification information of the bearer and the security activation status. The secondary station modification response may be an SgNB modification request ACK message, or may be another message. This is not limited. Optionally, the secondary station modification response includes an NR RRC reconfiguration message, the NR RRC reconfiguration message is transparent to the first access network device, and the NR RRC reconfiguration message carries the identification information of the bearer and the security activation status. In step S811, the first access network device sends an RRC reconfiguration message to the terminal device, where the RRC reconfiguration message includes the identification information of the bearer and the security activation status. Optionally, the RRC reconfiguration message includes an NR RRC reconfiguration message transparently transmitted by the first access network device, and the NR RRC reconfiguration message carries the identification information of the bearer and the security activation status.

Step S706: The terminal device enables user plane security with the second access network device based on the identification information of the bearer and the security activation status, that is, enables the user plane encryption protection and/or the user plane integrity protection of the bearer.

Optionally, after enabling the user plane security with the second access network device, the terminal device may send enablement indication information to the first access network device, and then the first access network device sends the enablement indication information to the second access network device. The enablement indication information indicates that the terminal device has enabled the user plane security with the second access network device. In this case, if the second access network device does not enable the user plane security with the terminal device after determining the security activation status, the second access network device may enable the user plane security with the terminal device based on the enablement indication information after receiving the enablement indication information.

For example, as shown in FIG. 8, in step S812, the terminal device may configure the second access network device as the secondary access network device in the dual connectivity based on the received RRC reconfiguration message, and enable the user plane security with the second access network device based on the security activation status. In step S813, the terminal device may send an RRC reconfiguration complete message to the first access network device, where the RRC reconfiguration complete message includes an NR RRC response message, and the NR RRC response message is transparent to the first access network device. Optionally, the NR RRC response message includes the enablement indication information, to indicate that the terminal device has enabled the user plane security with the second access network device. In step S814, the first access network device sends an RRC reconfiguration complete message to the second access network device, where the RRC reconfiguration complete message includes the transparently transmitted NR RRC response message. The second access network device may determine, based on the NR RRC response message, that the terminal device completes a dual connectivity related configuration.

In the foregoing technical solution, processing logic of the first access network device used as the master access network device and the second access network device used as the secondary access network device in a secondary station addition procedure in an inter-system dual connectivity scenario is enhanced. After receiving the request for allocating the resource for the dual connectivity of the terminal device, the second access network device may interact with the terminal device through the first access network device, to obtain the support capability of the terminal device for the user plane security. Then, when the terminal device supports the user plane security protection, the second access network device determines the security activation status based on the user plane security policy, and sends the security activation status to the terminal device. In this way, on-demand enablement of user plane security between the terminal device and the second access network device is implemented.

Solution 4

Figure 9:
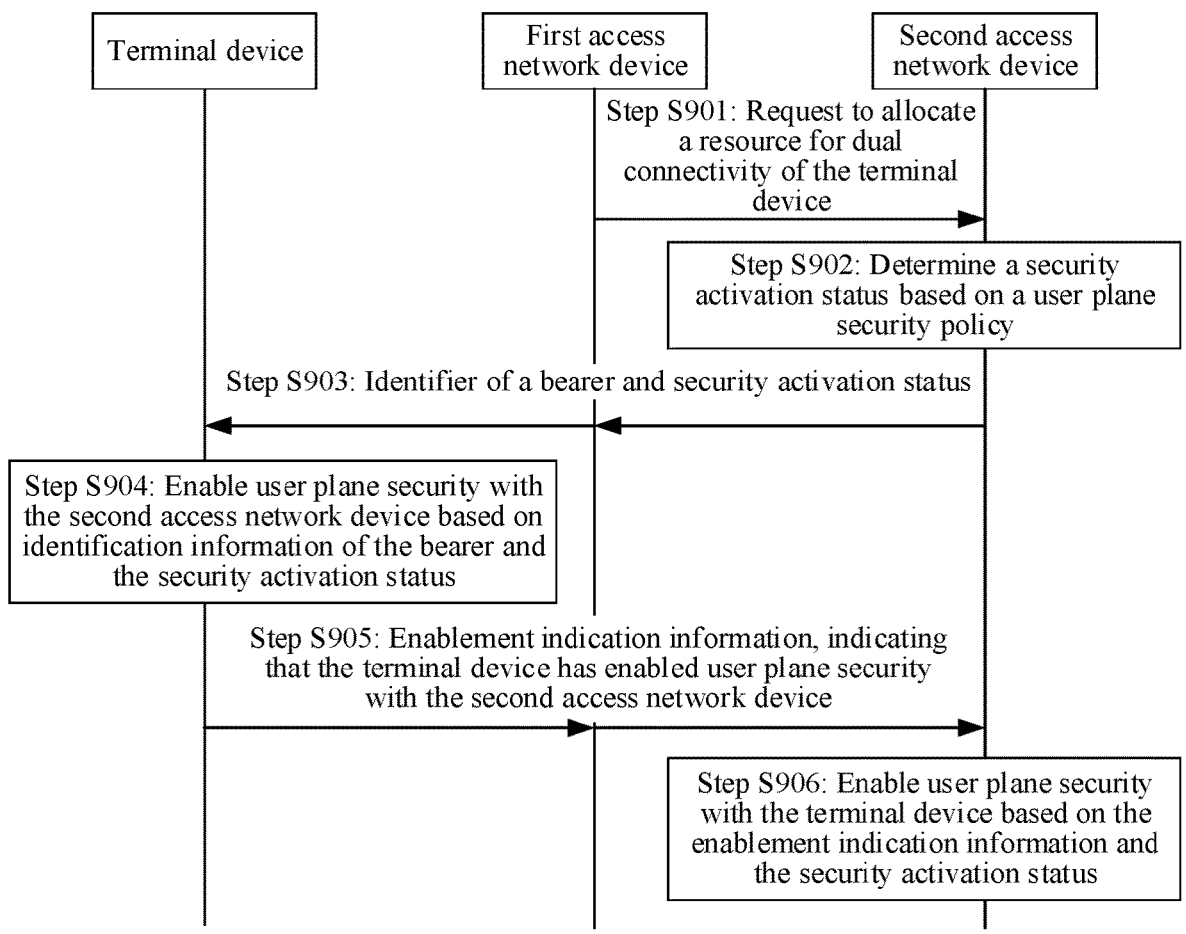
FIG. 9 is a schematic flowchart of another security activation method according to an embodiment of this application.

FIG. 9 is a schematic flowchart of a security activation method according to an embodiment of this application. The method includes the following steps.

Step S901: A first access network device in a first communication standard requests a second access network device in a second communication standard to allocate a resource for dual connectivity of a terminal device, where the first access network device is a master access network device in the dual connectivity of the terminal device, and the second access network device is a secondary access network device in the dual connectivity of the terminal device.

Correspondingly, the second access network device accepts the request of the first access network device for allocating the resource for the dual connectivity of the terminal device.

Figure 10:
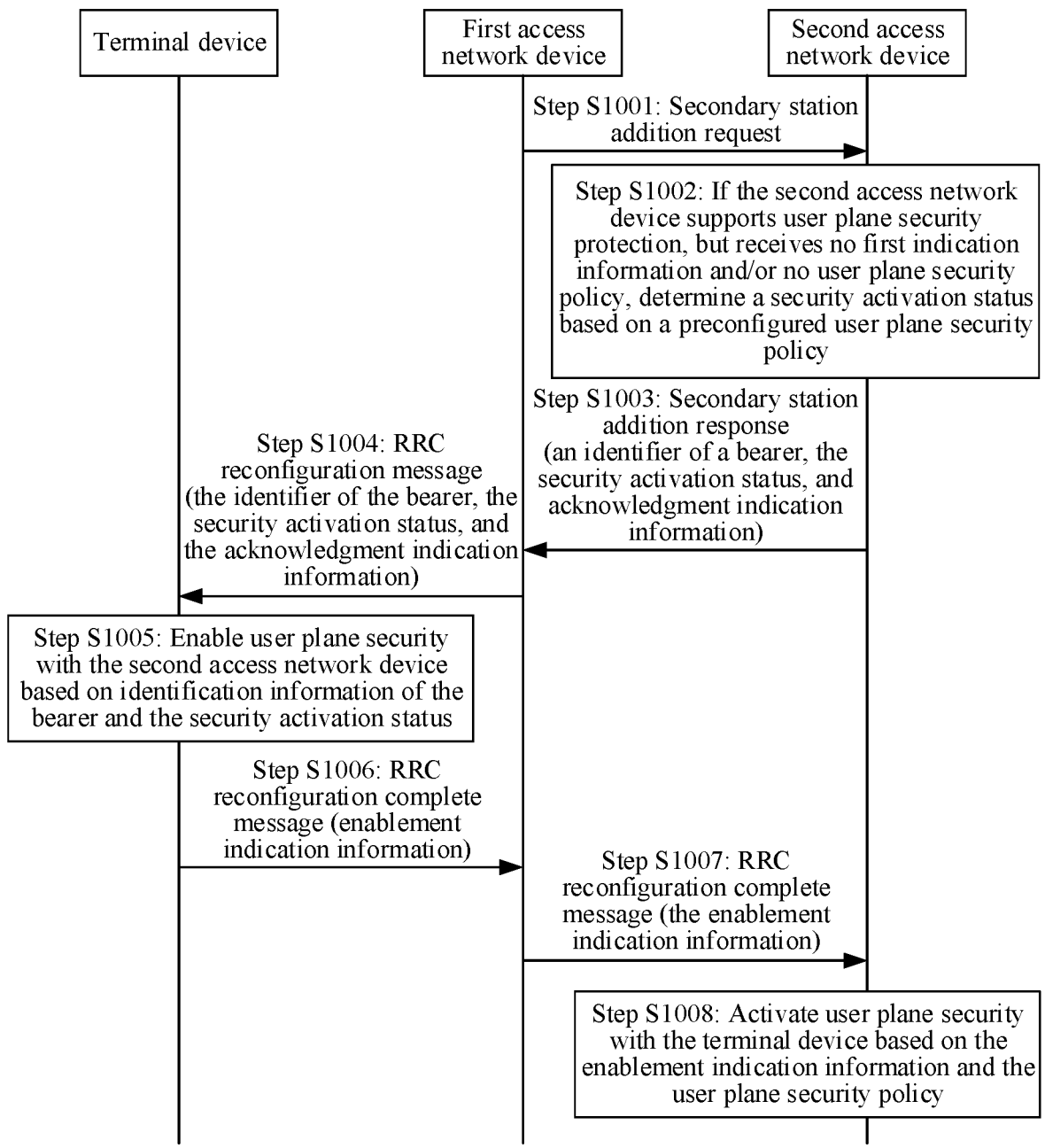
FIG. 10 shows a specific example of another security activation method according to an embodiment of this application.

For example, as shown in FIG. 10, if processing logic of the first access network device is not enhanced, the first access network device may not support user plane security protection. In this case, even if a first security capability (for example, a UE EPS security capability) or a first wireless capability (for example, a UE E-UTRAN wireless capability) that is of the terminal device and that corresponds to the first communication standard indicates that the terminal device supports the user plane security protection, the first access network device cannot transmit first indication information to the second access network device in a secondary station addition procedure, and a user plane security policy may be lost.

In step S1001, if the first access network device determines to request the second access network device to allocate a resource for a specific E-RAB, the first access network device may initiate the secondary station addition procedure, and send a secondary station addition request to the second access network device, where the secondary station addition request is used to request to allocate the resource for the dual connectivity of the terminal device. The secondary station addition request may include a second security capability that is of the terminal device and that corresponds to the second communication standard, for example, an NR security capability of the terminal device. It should be noted that the secondary station addition request includes neither of the first indication information and the user plane security policy that are mentioned above. The secondary station addition procedure may be an SgNB addition procedure, and the secondary station addition request may be an SgNB addition request message, or may be another message. This is not limited in this application.

Step S902: The second access network device determines a security activation status based on the user plane security policy.

The user plane security policy is preconfigured in the second access network device, or may be referred to as a default user plane security policy. The security activation status may be a security activation status corresponding to a bearer allocated to the terminal device, and the bearer is for transmission of user plane data between the terminal device and the second access network device.

The security activation status indicates whether to enable user plane encryption protection and/or user plane integrity protection of the bearer. For specific content, refer to related descriptions in step S302.

It should be noted that in the solution 4, because the second access network device receives no first indication information indicating that the terminal device supports the user plane security protection, the second access network device does not know whether the terminal device supports the user plane security protection, and determines the security activation status based on the preconfigured user plane security policy. Therefore, in this case, after determining the security activation status, the second access network device may temporarily not enable user plane security with the terminal device, but enable the user plane security with the terminal device after receiving enablement indication information from the terminal device.

For example, as shown in FIG. 10, after the second access network device receives the secondary station addition request from the first access network device, in step S1002, if the second access network device supports the user plane security protection, but the second access network device receives no first indication information and/or no user plane security policy, the second access network device may determine the security activation status based on the preconfigured user plane security policy. The second access network device may further allocate the resource for the requested E-RAB based on the secondary station addition request received from the first access network device, and construct an NR RRC reconfiguration message.

Step S903: The second access network device sends identification information of the bearer and the security activation status to the terminal device through the first access network device, where the security activation status indicates whether to enable the user plane encryption protection and/or the user plane integrity protection of the bearer.

Correspondingly, the terminal device receives the identification information of the bearer and the security activation status from the second access network device through the first access network device.

The identification information of the bearer may be a data radio bearer (data radio bearer, DRB) identifier (drb-identity), an EPS bearer identifier (EPS-BearerIdentity), or the like. This is not limited.

Optionally, the second access network device may further send acknowledgment indication information to the terminal device through the first access network device. The acknowledgment indication information indicates the terminal device to send the enablement indication information after the terminal device enables the user plane security with the second access network device. The acknowledgment indication information may also be referred to as an activation acknowledgment indication. The acknowledgment indication information may be additional 1-bit indication information, or may be implicitly indicated by using the security activation status. The implicit indication means that if the second access network device sends the security activation status, it indicates that the acknowledgment indication information exists; or if the second access network device does not send the security activation status, it indicates that the acknowledgment indication information does not exist.

For example, as shown in FIG. 10, in step S1003, the second access network device may send a secondary station addition response to the first access network device, where the secondary station addition response includes the identification information of the bearer and the security activation status. Optionally, the secondary station addition response further includes acknowledgment indication information, and the acknowledgment indication information is 1-bit indication information in the secondary station addition response. The secondary station addition response may be an SgNB addition request ACK message or an SgNB addition response message, or may be another message. This is not limited in this application. Optionally, the secondary station addition response may include an NR RRC reconfiguration message, the NR RRC reconfiguration message is transparent to the first access network device, and the NR RRC reconfiguration message carries the identification information of the bearer and the security activation status. Optionally, the NR RRC reconfiguration message further includes the acknowledgment indication information. In step S1004, the first access network device may send an RRC reconfiguration message to the terminal device, where the RRC reconfiguration message includes the identification information of the bearer and the security activation status, and optionally, further includes the acknowledgment indication information. Optionally, the RRC reconfiguration message includes the transparently transmitted NR RRC reconfiguration message, and the NR RRC reconfiguration message carries the identification information of the bearer and the security activation status, and optionally, further includes the acknowledgment indication information.

Step S904: The terminal device enables user plane security with the second access network device based on the identification information of the bearer and the security activation status, that is, enables the user plane encryption protection and/or the user plane integrity protection of the bearer.

Step S905: The terminal device sends the enablement indication information to the second access network device through the first access network device, where the enablement indication information indicates that the terminal device has enabled the user plane security with the second access network device.

Correspondingly, the second access network device receives the enablement indication information from the terminal device through the first access network device.

In this embodiment of this application, if the terminal device supports the user plane security protection, the terminal device may enable the user plane security with the second access network device based on the received security activation status, and then send the enablement indication information to the second access network device based on the acknowledgment indication information or the security activation status. Otherwise, if the terminal device does not support the user plane security protection, the terminal device may not perform any processing, for example, may discard or ignore the received information such as the identification information of the bearer and the security activation status.

Step S906: The second access network device enables the user plane security with the terminal device based on the enablement indication information and the security activation status.

For example, as shown in FIG. 10, in step S1005, if the terminal device supports the user plane security protection, the terminal device may configure the second access network device as the secondary access network device in the dual connectivity based on the received RRC reconfiguration message, and enable the user plane security with the second access network device based on the security activation status. In step S1006, the terminal device may send an RRC reconfiguration complete message to the first access network device, where the RRC reconfiguration complete message includes an NR RRC response message, and the NR RRC response message is transparent to the first access network device. The NR RRC response message includes the enablement indication information, to indicate whether the terminal device has enabled the user plane security with the second access network device. In step S1007, the first access network device sends an RRC reconfiguration complete message to the second access network device, where the RRC reconfiguration complete message includes the transparently transmitted NR RRC response message, and the NR RRC response message includes the enablement indication information. Further, in step S1008, the second access network device may activate the user plane security with the terminal device based on the enablement indication information in the NR RRC response message and the security activation status previously determined based on the preconfigured user plane security policy. If no enablement indication information is received, the second access network device may activate the user plane security with the terminal device in a default manner, that is, enable user plane encryption protection, but not enable user plane integrity protection.

In the foregoing technical solution, processing logic of the first access network device used as the master access network device and the second access network device used as the secondary access network device in a secondary station addition procedure in an inter-system dual connectivity scenario is enhanced. After receiving the secondary station addition request, if the second access network device receives no first indication information or user plane security policy, the second access network device may determine the security activation status based on the preconfigured user plane security policy, and send the security activation status to the terminal device. If the terminal device supports the user plane security protection, the terminal device may enable the user plane security with the second access network device based on the received security activation status, and send the enablement indication information. In this way, after receiving the enablement indication information sent by the terminal device, the second access network device can enable the user plane security with the terminal device, so that on-demand enablement of user plane security between the terminal device and the second access network device is implemented. If the terminal device does not support the user plane security protection, the terminal device may not perform any processing, for example, may discard or ignore the received identification information of the bearer and the received security activation status. It can be learned that, in this technical solution, when whether the terminal device supports the user plane security protection is not determined, the security activation status may be determined based on the preconfigured user plane security policy, and sent to the terminal device. Compared with a technical solution in which whether the terminal device has a capability of supporting the user plane security protection is confirmed with the terminal device before the security activation status is determined, this technical solution can effectively reduce signaling overheads.

The following describes in detail the security activation method in this application by using an example in which the first access network device is an MeNB and the second access network device is an SgNB.

Figure 11:
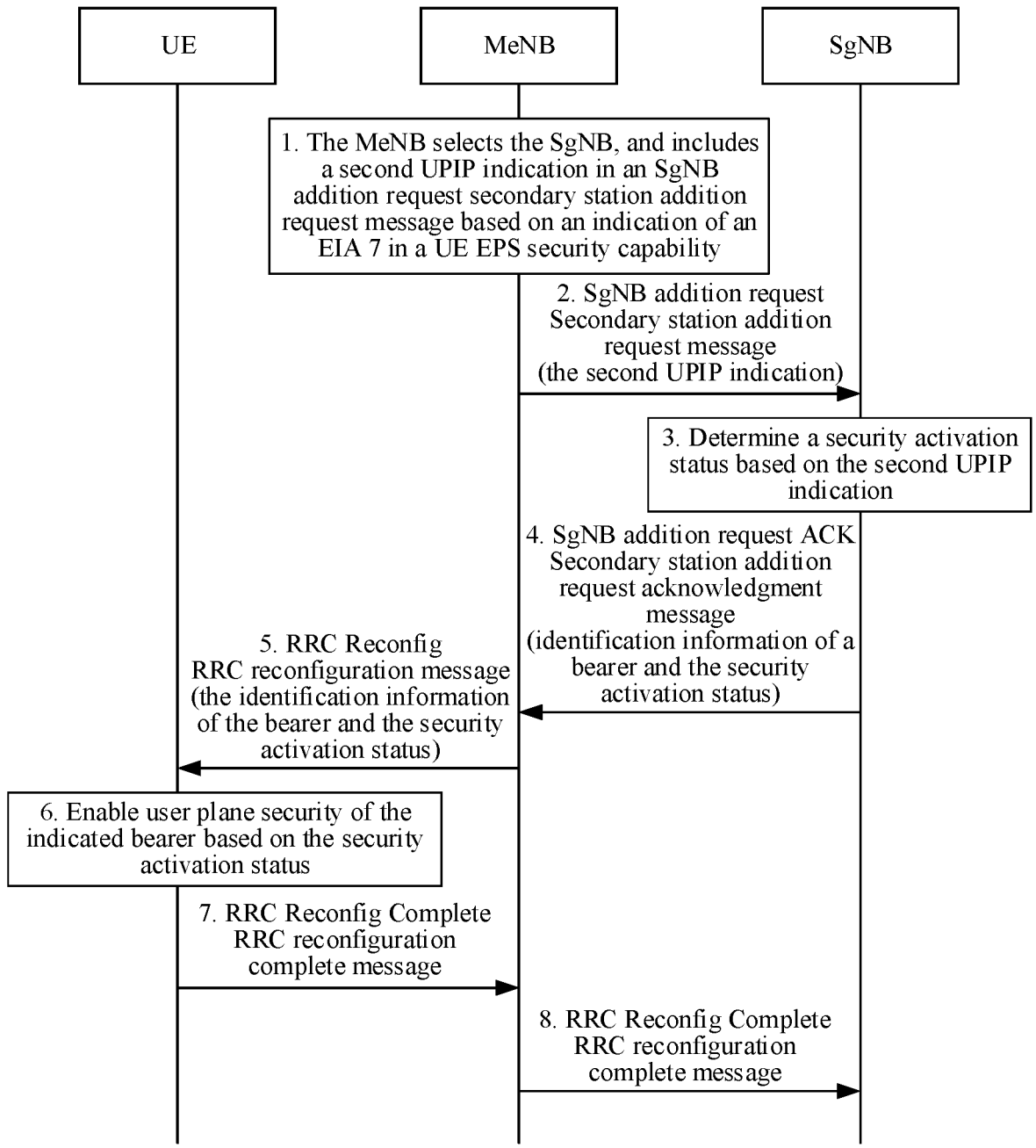
FIG. 11 is a schematic flowchart of another security activation method according to an embodiment of this application.

FIG. 11 is a schematic flowchart of a security activation method according to an embodiment of this application. As shown in FIG. 11, the method includes the following steps.

Step 1: An MeNB selects an SgNB, and includes a second UPIP indication in an SgNB addition request message based on an indication of an EIA 7 in a UE EPS security capability or an indication that is included in a UE E-UTRAN/MR-DC wireless capability and that indicates that user plane security protection is supported (the foregoing three types of indications are referred to as a first user plane integrity protection UPIP indication in this application).

The MeNB selects the SgNB in the following two manners.

Manner 1: The MeNB selects the SgNB based on existing logic. In this case, whether the SgNB supports UPIP does not need to be preconfigured in the MeNB. Therefore, the MeNB may select an SgNB that supports the UPIP, or may select an SgNB that does not support the UPIP.

Manner 2: Whether the SgNB supports UPIP is preconfigured in the MeNB (for example, by using a network management system). The MeNB selects the SgNB based on a user plane integrity protection policy. If the user plane integrity protection policy indicates "required", the MeNB selects an SgNB that supports the UPIP. If the SgNB that supports the UPIP cannot be selected, the MeNB cannot add/offload (offload) an E-UTRAN radio access bearer E-RAB corresponding to the user plane integrity protection policy to the SgNB. In another scenario, the MeNB may select an SgNB that does not support the UPIP. Further, the MeNB may select, based on the user plane integrity protection policy and the first UPIP indication, an SgNB that supports the UPIP. Specifically, if the user plane integrity protection policy indicates "required" and the first UPIP indication indicates that UE supports the UPIP, the MeNB selects an SgNB that supports the UPIP.

Based on the manner 1, the MeNB may further perform additional determining on the user plane integrity protection policy. For example, if the user plane integrity protection policy indicates "required", the MeNB may set, in the SgNB addition request message, a newly added information element (for example, the second UPIP indication and/or a user plane security policy) as criticality information (criticality information) whose type is reject IE, so that the SgNB rejects the current SgNB addition request when the SgNB does not identify the information element. If the user plane integrity protection policy indicates "not needed" or "preferred", the MeNB sets, in the SgNB addition request message, a newly added information element as criticality information whose type is ignore IE, so that the SgNB ignores the information element when the SgNB does not identify the information element, but a subsequent procedure is not affected.

In a possible implementation, if the MeNB determines, based on a current context of the UE, that the UE supports the UPIP, the second UPIP indication is carried in step 2, and the second UPIP indication indicates that the UE supports the UPIP. For example, the MeNB may determine, based on the indication of the EIA 7 in the UE EPS security capability, that the UE supports the UPIP; or the MeNB may determine, based on the indication that is included in the UE E-UTRAN wireless capability and that indicates that the UE supports user plane security protection, that the UE supports the UPIP. The second UPIP indication may be the following content: a new information element (for example, the UE EPS security capability (including the EIA 7) or 1 new bit) in the SgNB addition request message, used to indicate that the UE supports the UPIP. Alternatively, the second UPIP indication is encapsulated into an existing information element of the SgNB addition request message, for example, a UE NR security capability. In a manner, the MeNB maps the EIA 7 to an NIA 7.

In another possible implementation, the MeNB directly includes the second UPIP indication in step 2 based on the current context of the UE, where the second UPIP indication indicates that the UE supports the UPIP. For example, the MeNB uses an MR-DC wireless capability in the current context of the UE as the second UPIP indication.

Step 2: The MeNB sends the SgNB addition request message to the SgNB, where the message carries the second UPIP indication. The message is used to request to allocate a resource for dual connectivity of the UE.

The MeNB sends the user plane security policy in two manners.

Manner 1: Only a user plane security policy received from a core network is sent. If no user plane security policy is received from the core network, a user plane security policy preconfigured in the MeNB is not sent either.

Manner 2: If a user plane security policy is received from a core network, the user plane security policy received from the core network is sent. If no user plane security policy is received from a core network, a user plane security policy preconfigured in the MeNB is sent.

It can be learned from the foregoing two manners of sending the user plane security policy by the MeNB that the SgNB addition request message optionally carries the user plane security policy.

The user plane security policy includes a user plane encryption protection policy and/or a user plane integrity protection policy. The user plane encryption protection policy indicates whether to enable user plane encryption protection, and the user plane integrity protection policy indicates whether to enable user plane integrity protection. The user plane encryption protection policy has three possible values: not needed, preferred, and required. The user plane integrity protection policy also has three possible values: not needed, preferred, and required. Herein, "not needed" indicates that enablement of protection is not needed, "preferred" indicates that enablement of protection is preferred or not, and "required" indicates that enablement of protection is required. The foregoing three possible values each may be indicated by using 2 bits (bit). For example, 00 indicates that enablement of protection is not needed, 01 indicates that enablement of protection may is preferred or not, and 11 indicates that enablement of protection is required.

Step 3: The SgNB determines a security activation status based on the second UPIP indication and the user plane security policy.

Corresponding to the manner 1 in which the MeNB sends the user plane security policy, if the SgNB receives the user plane security policy from the MeNB, the SgNB may determine the security activation status based on the second UPIP indication and the received user plane security policy when the UE supports the UPIP. If the SgNB receives no user plane security policy from the MeNB, when the UE supports the UPIP, the SgNB may determine the security activation status based on the second UPIP indication and a user plane security policy preconfigured in the SgNB.

Corresponding to the manner 2 in which the MeNB sends the user plane security policy, the SgNB always receives the user plane security policy from the MeNB, and the SgNB determines the security activation status based on the second UPIP indication and the received user plane security policy when the UE supports the UPIP.

The security activation status indicates whether to enable user plane encryption protection and/or user plane integrity protection. The SgNB determines a user plane security activation status of a bearer based on the user plane security policy.

Specifically, if the user plane encryption protection policy indicates "required", the SgNB determines that all encryption activation states of bearers corresponding to the SgNB are enabled. If the user plane encryption protection policy indicates "preferred", the SgNB determines that an encryption activation state of a bearer corresponding to the SgNB may be enabled or disabled. The SgNB may determine, based on a local policy (for example, a running status of the SgNB, a control policy, or a regulation requirement), whether to enable the encryption activation state. If the user plane encryption protection policy indicates "not needed", the SgNB determines that all encryption activation states of bearers corresponding to the SgNB are disabled.

If the user plane integrity protection policy indicates "required", the SgNB determines that all integrity protection activation states of bearers corresponding to the SgNB are enabled. If the user plane integrity protection policy indicates "preferred", the SgNB determines that an integrity protection activation state of a bearer corresponding to the SgNB may be enabled or disabled. The SgNB may determine, based on a local policy (for example, a running status of the SgNB, a control policy, or a regulation requirement), whether to enable the integrity protection activation state. If the user plane integrity protection policy indicates "not needed", the SgNB determines that all integrity protection activation states of bearers corresponding to the SgNB are disabled.

Optionally, if the SgNB receives the user plane integrity protection policy from the MeNB, and the user plane integrity protection policy indicates "required", the SgNB further needs to send an enablement support indication to the MeNB in step 4. The enablement support indication indicates that the SgNB supports the UPIP. Alternatively, the SgNB may enable user plane integrity protection based on the user plane integrity protection policy, or the SgNB determines to enable user plane integrity protection.

Step 4: The SgNB sends an SgNB addition request ACK message or an SgNB addition response message to the MeNB. The message indicates that preparation for adding the SgNB is completed.

The message carries an NR RRC reconfiguration message, which is transparent to the MeNB. The NR RRC reconfiguration message carries identification information of the bearer and the security activation status.

The bearer identified by the identification information of the bearer is for transmission of user plane data between the UE and the SgNB. The identification information of the bearer may be a data radio bearer (data radio bearer, DRB) identifier (drb-identity) or an EPS bearer identifier (EPS-BearerIdentity).

Optionally, the message further carries the enablement support indication. The MeNB performs additional determining. If the current user plane integrity protection policy indicates "required", but the MeNB receives no enablement support indication, the MeNB triggers an SgNB release procedure, to indicate the SgNB to release the resource allocated for the dual connectivity of the UE. Optionally, the MeNB reselects an SgNB, and re-performs step 1. If the current user plane integrity protection policy indicates "required", but the MeNB receives the enablement support indication, or the current user plane integrity protection policy indicates "preferred" or "not needed", the MeNB continues to perform step 5.

Step 5: The MeNB sends an RRC reconfiguration message to the UE, where the message carries the transparently transmitted NR RRC reconfiguration message. The NR RRC reconfiguration message carries the identification information of the bearer and the security activation status.

Step 6: The UE configures configuration information of the SgNB based on the NR RRC reconfiguration message, and enables user plane security of the indicated bearer based on the security activation status. The "enable" may also be understood as a meaning of "activate". The user plane security includes user plane encryption protection and/or user plane integrity protection.

Step 7: The UE returns an RRC reconfiguration complete message, where the message carries an NR RRC response message.

Step 8: The MeNB sends an RRC reconfiguration complete message to the SgNB, where the message carries an NR RRC response message. The SgNB determines, based on the NR RRC response message, that the UE completes a configuration.

In the foregoing technical solution, processing logic of the master station MeNB and the secondary station SgNB in a secondary station addition procedure in an inter-system dual connectivity scenario is enhanced. The master station MeNB may send, to the secondary station SgNB, the second UPIP indication indicating that the UE supports the UPIP, or further send the user plane security policy. The secondary station SgNB determines the security activation status based on the second UPIP indication and the user plane security policy, and sends the security activation status to the UE. In this way, on-demand enablement of user plane security between the UE and the secondary station SgNB is implemented. In addition, the method for determining, by the MeNB based on the user plane integrity protection policy, whether the SgNB supports the UPIP avoids a problem that when the user plane integrity protection policy indicates "enabling", the SgNB ignores the user plane integrity protection policy because the SgNB does not support the UPIP, and consequently security is reduced.

Figure 12:
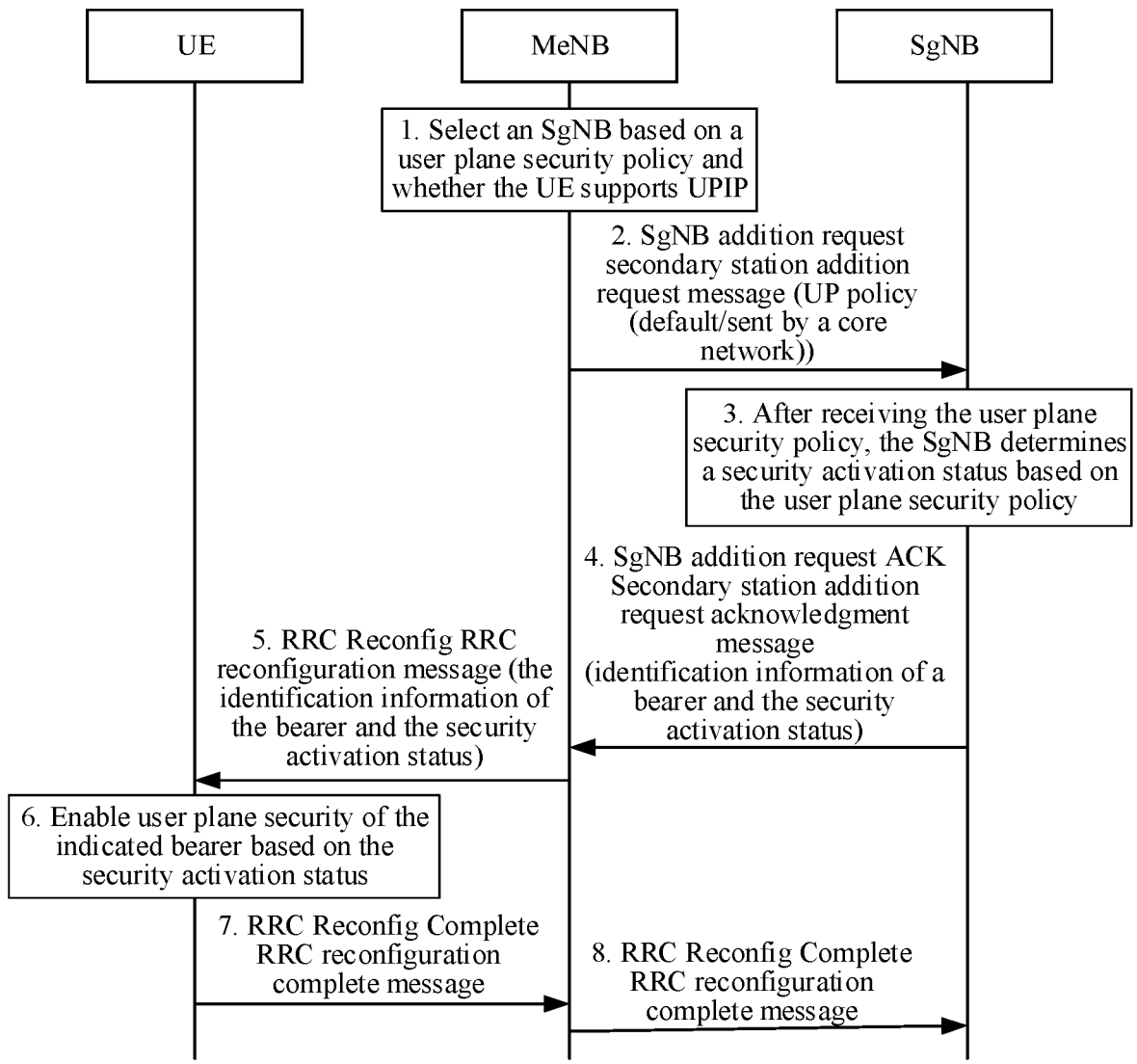
FIG. 12 is a schematic flowchart of another security activation method according to an embodiment of this application.

FIG. 12 is a schematic flowchart of a security activation method according to an embodiment of this application. As shown in FIG. 12, the method includes the following steps.

Step 1: An MeNB selects an SgNB based on a user plane security policy and whether UE supports UPIP.

If the UE supports the UPIP, and a user plane integrity protection policy in the user plane security policy indicates "required", the MeNB selects an SgNB that supports the UPIP (a capability about whether the SgNB supports the UPIP may be preconfigured in the MeNB by using a network management system), and includes the user plane security policy in step 2. If the SgNB that supports the UPIP cannot be selected, the MeNB cannot add/offload (offload) an E-RAB corresponding to the user plane integrity protection policy to the SgNB.

If the UE supports the UPIP, and a user plane integrity protection policy in the user plane security policy indicates "preferred/not needed", the MeNB preferentially selects an SgNB that supports the UPIP, and includes the user plane security policy in step 2. If the SgNB that supports the UPIP cannot be selected, the MeNB may select an SgNB that does not support the UPIP, and add/offload (offload) an E-RAB corresponding to the user plane integrity protection policy to the SgNB.

If the UE does not support the UPIP, the MeNB selects the SgNB based on existing logic, and does not include the user plane security policy in step S2.

Step 2: The MeNB sends an SgNB addition request message to the SgNB, where the message may carry the user plane security policy.

The user plane security policy may be obtained in two manners. If the MeNB receives a user plane security policy from a core network, the MeNB may send the user plane security policy received from the core network. If the MeNB receives no user plane security policy from a core network, but the UE supports the UPIP, the MeNB may send a preconfigured user plane security policy.

Step 3: After receiving the user plane security policy, the SgNB may determine a security activation status based on the user plane security policy.

Otherwise, if the SgNB receives no user plane security policy, the SgNB does not need to determine a security activation status, and configures a DRB in an existing manner.

Step 4: The SgNB sends an SgNB addition request ACK message or an SgNB addition response message to the MeNB, where the message carries an NR RRC reconfiguration message, which is transparent to the MeNB. The NR RRC reconfiguration message carries identification information of a bearer and the security activation status.

Step 5: The MeNB sends an RRC reconfiguration message to the UE, where the message carries the transparently transmitted NR RRC reconfiguration message. The NR RRC reconfiguration message carries the identification information of the bearer and the security activation status.

Step 6: The UE configures configuration information of the SgNB based on the NR RRC reconfiguration message, and enables user plane security of the indicated bearer based on the security activation status. The "enable" may also be understood as a meaning of "activate".

Step 7: The UE returns an RRC reconfiguration complete message, where the message carries an NR RRC response message.

Step 8: The MeNB sends an RRC reconfiguration complete message to the SgNB, where the message carries an NR RRC response message. The SgNB determines, based on the NR RRC response message, that the UE completes a configuration.

In the foregoing technical solution, processing logic of the master station MeNB and the secondary station SgNB in a secondary station addition procedure in an inter-system dual connectivity scenario is enhanced. The master station MeNB determines whether the UE supports the UPIP, and sends the user plane security policy to the secondary station SgNB. The secondary station SgNB determines the security activation status based on the user plane security policy and sends the security activation status to the UE. In this way, on-demand enablement of user plane security between the UE and the secondary station SgNB is implemented.

Figure 13:
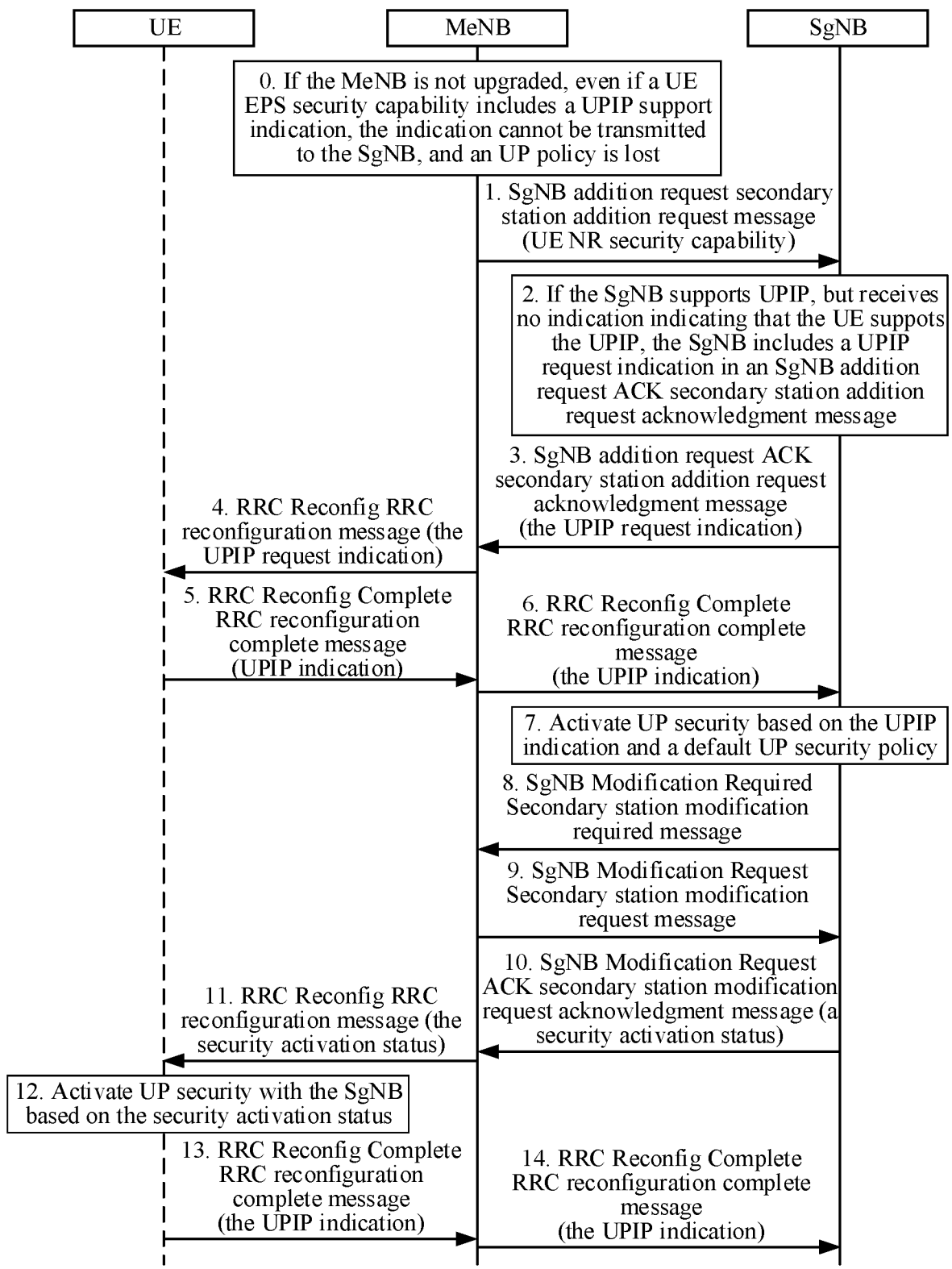
FIG. 13 is a schematic flowchart of another security activation method according to an embodiment of this application.

FIG. 13 is a schematic flowchart of a security activation method according to an embodiment of this application. As shown in FIG. 13, the method includes the following steps.

Step 0: If an MeNB is not upgraded, the MeNB does not support UPIP. In this case, the MeNB cannot include a UP policy and/or a second UPIP indication in an SgNB addition request message.

The MeNB determines to request an SgNB to allocate a resource for a specific E-RAB. The MeNB may initiate the following SgNB addition procedure.

Step 1: The MeNB sends an SgNB addition request message to the SgNB.

Step 2: The SgNB allocates the resource for the requested E-RAB based on the SgNB addition request message, and the SgNB constructs an NR RRC reconfiguration message. If the SgNB supports the UPIP, because the SgNB receives no second UPIP indication and/or no user plane security policy, the SgNB includes a UPIP request indication in the NR RRC reconfiguration message, where the UPIP request indication is used to request whether the UE supports the UPIP.

Step 3: The SgNB sends an SgNB addition request ACK message to the MeNB, where the message carries the NR RRC reconfiguration message, which is transparent to the MeNB. The NR RRC reconfiguration message carries the UPIP request indication.

Step 4: The MeNB sends an RRC reconfiguration message to the UE, where the message carries the transparently transmitted NR RRC reconfiguration message. The NR RRC reconfiguration message carries the UPIP request indication.

Step 5: The UE sends a third UPIP indication to the SgNB based on the UPIP request indication in the NR RRC reconfiguration message if the UE supports the UPIP, where the third UPIP indication may be 1 bit, and indicates whether the UE supports the UPIP. Specifically, the UE sends an RRC reconfiguration message to the MeNB, and the message carries an NR RRC response message. The NR RRC response message includes the third UPIP indication.

Step 6: The MeNB sends an SgNB reconfiguration complete message to the SgNB, where the message carries an NR RRC response message. The NR RRC response message includes the third UPIP indication.

Step 7: The SgNB determines a security activation status based on the third UPIP indication and a preconfigured user plane security policy.

The preconfigured user plane security policy may also be referred to as a default user plane security policy.

Step 8: Because the security activation status with the UE needs to be updated, the SgNB triggers an SgNB initiated SgNB modification procedure, that is, the SgNB sends an SgNB modification required message to the MeNB.

Step 9: The MeNB sends an SgNB modification request message to the SgNB.

Step 10: The SgNB sends an SgNB modification request ACK message to the MeNB, where the message carries an NR RRC reconfiguration message. The NR RRC reconfiguration message carries identification information of a bearer and the security activation status.

Step 11: The MeNB sends an RRC reconfiguration message to the UE, where the message carries the transparently transmitted NR RRC reconfiguration message. The NR RRC reconfiguration message carries the identification information of the bearer and the security activation status.

Step 12: The UE configures configuration information of the SgNB based on the NR RRC reconfiguration message, and enables user plane security with the SgNB based on the security activation status. The "enable" may also be understood as a meaning of "activate".

Step 13: The UE returns an RRC reconfiguration complete message, where the message carries an NR RRC response message.

Step 14: The MeNB sends an RRC reconfiguration complete message to the SgNB, where the message carries an NR RRC response message. The SgNB determines, based on the NR RRC response message, that the UE completes a configuration.

In the foregoing technical solution, processing logic of the UE and the secondary station SgNB in a secondary station addition procedure in an inter-system dual connectivity scenario is enhanced. After receiving the secondary station addition request, the secondary station SgNB obtains a UPIP capability of the UE by interacting with the UE, then determines the security activation status based on the user plane security policy when the UE supports the UPIP, and sends the security activation status to the UE. In this way, on-demand enablement of user plane security between the UE and the secondary station SgNB is implemented.

Figure 14:
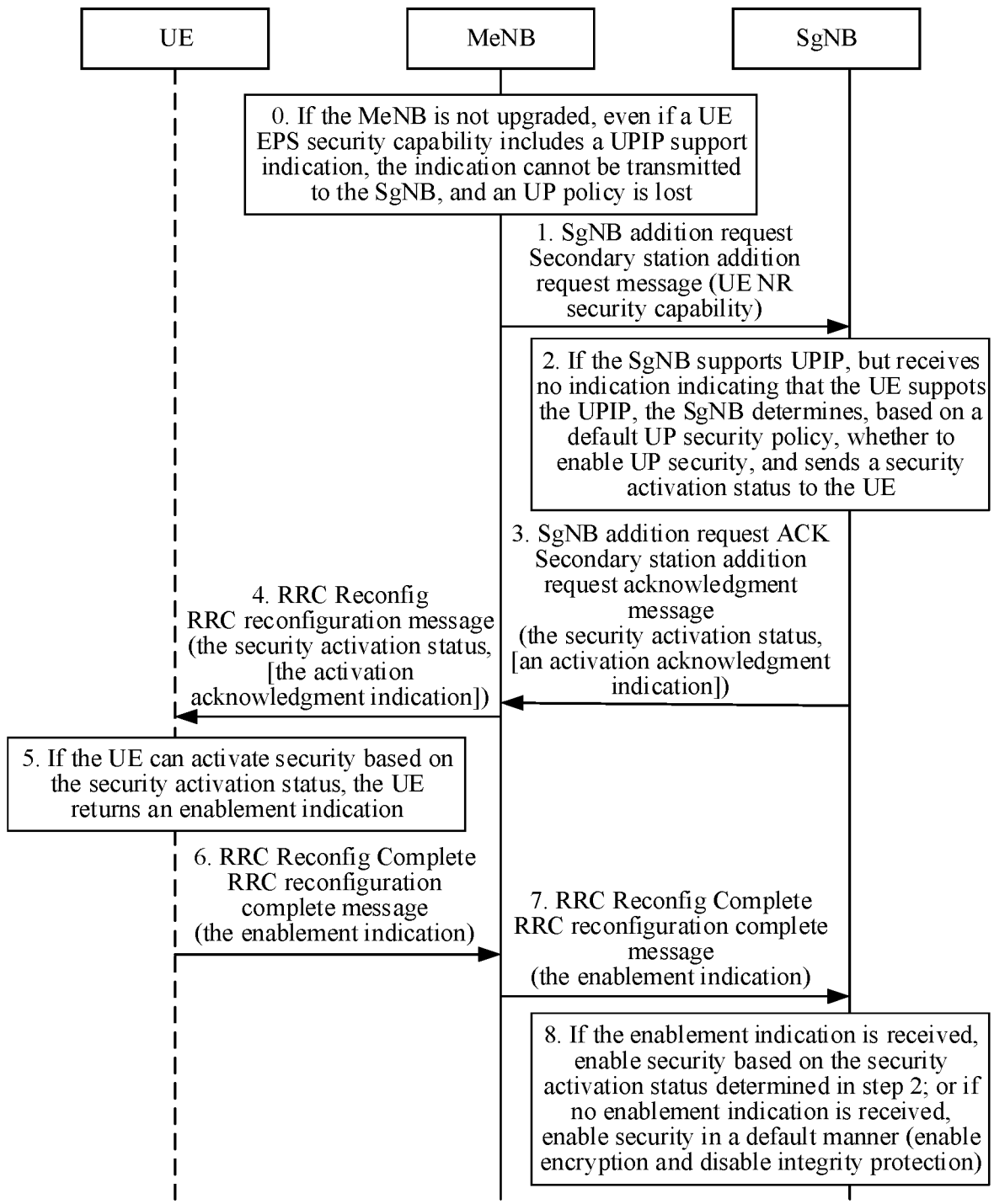
FIG. 14 is a schematic flowchart of another security activation method according to an embodiment of this application.

FIG. 14 is a schematic flowchart of a security activation method according to an embodiment of this application. As shown in FIG. 14, the method includes the following steps.

Step 0: If an MeNB is not upgraded, the MeNB does not support UPIP. In this case, the MeNB cannot include a UP policy and/or a second UPIP indication in an SgNB addition request message.

The MeNB determines to request an SgNB to allocate a resource for a specific E-RAB. The MeNB may initiate the following SgNB addition procedure.

Step 1: The MeNB sends an SgNB addition request message to the SgNB, where the message carries a UE NR security capability.

Step 2: The SgNB allocates the resource for the requested E-RAB based on the SgNB addition request message, and the SgNB constructs an NR RRC reconfiguration message. If the SgNB is upgraded to support the UPIP, because the SgNB receives no second UPIP indication and/or no user plane security policy, the SgNB may determine, based on a preconfigured user plane security policy, whether to enable UP security, and determine a security activation status.

The SgNB includes the security activation status in an NR RRC reconfiguration message. Optionally, the SgNB further includes an activation acknowledgment indication in the NR RRC reconfiguration message, to indicate the UE to return an activation acknowledgment indication after the UE activates UP security based on the security activation status. The activation acknowledgment indication may be an additional bit, or may be implicitly indicated by using the security activation status.

It should be noted that the SgNB does not activate user plane security with the UE in this case.

Step 3: The SgNB sends an SgNB addition request ACK message to the MeNB, where the message carries the NR RRC reconfiguration message, which is transparent to the MeNB. The NR RRC reconfiguration message carries identification information of a bearer and the security activation status, and optionally, further includes the activation acknowledgment indication.

Step 4: The MeNB sends an RRC reconfiguration message to the UE, where the message carries the transparently transmitted NR RRC reconfiguration message. The NR RRC reconfiguration message carries the identification information of the bearer and the security activation status, and optionally, further includes the activation acknowledgment indication.

Step 5: The UE activates user plane security with the SgNB based on the security activation status in the NR RRC reconfiguration message if the UE supports the UPIP and the UE receives the security activation status from the SgNB.

The UE sends an enablement indication to the SgNB based on the activation acknowledgment indication or the security activation status. The enablement indication may be 1 bit, and indicates whether the UE enables security based on the security activation status.

Step 6: The UE sends an RRC reconfiguration complete message to the MeNB, where the message carries an NR RRC response message. The NR RRC response message includes the enablement indication.

Step 7: The MeNB sends an RRC reconfiguration complete message to the SgNB, where the message carries an NR RRC response message. The NR RRC response message includes the enablement indication.

Step 8: After receiving the enablement indication, the SgNB may activate user plane security with the UE based on the enablement indication and the security activation status determined in step 2. If the SgNB receives no enablement indication, the SgNB may activate user plane security with the UE in a default manner, that is, enable user plane encryption protection but not enable user plane integrity protection.

In the foregoing technical solution, processing logic of the UE and the secondary station SgNB in a secondary station addition procedure in an inter-system dual connectivity scenario is enhanced. After receiving the secondary station addition request, if the secondary station SgNB receives no second UPIP indication or user plane security policy, the secondary station SgNB may determine the security activation status based on the preconfigured user plane security policy, and send the security activation status to the UE. If the UE supports the UPIP, the UE may enable the user plane security with the SgNB based on the received security activation status, and feed back the enablement indication. If the UE supports the UPIP, the UE may not perform any processing, for example, may discard or ignore the received security activation status. In this way, after receiving the enablement indication of the UE, the SgNB may enable user plane security with the UE, so that on-demand enablement of user plane security between the UE and the secondary station SgNB is implemented. In addition, this technical solution can further effectively reduce signaling overheads.

Figure 15:
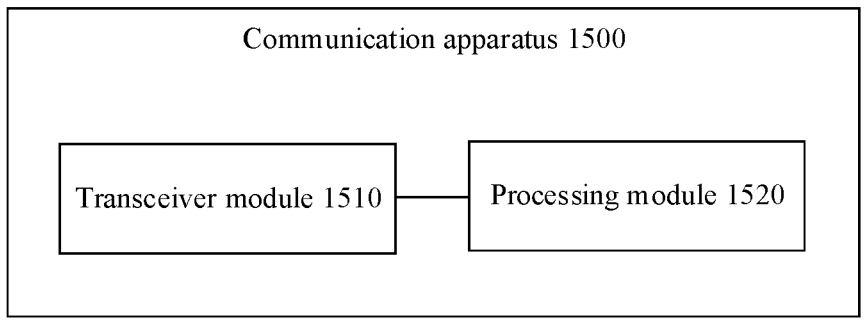
FIG. 15, FIG. 16, and FIG. 17 each are a schematic diagram of a structure of a communication apparatus according to an embodiment of this application.

An embodiment of this application further provides a communication apparatus. FIG. 15 is a schematic diagram of a structure of a communication apparatus according to an embodiment of this application. The communication apparatus 1500 includes a transceiver module 1510 and a processing module 1520. The communication apparatus may be configured to implement a function of the access network device (for example, the first access network device or the second access network device) in any one of the foregoing method embodiments. For example, the communication apparatus may be an access network device or a chip or a circuit included in an access network device.

The communication apparatus may alternatively be configured to implement a function of the terminal device in any one of the foregoing method embodiments. For example, the communication apparatus may be a terminal device, for example, a handheld terminal device or a vehicle-mounted terminal device. Alternatively, the communication apparatus may be a chip or a circuit included in a terminal device, or an apparatus including a terminal device, for example, various types of vehicles.

For example, when the communication apparatus performs an operation or a step corresponding to the first access network device in the method embodiment shown in FIG. 3, the processing module 1520 is configured to: request, by using the transceiver module 1510, a second access network device in a second communication standard to allocate a resource for dual connectivity of a terminal device, and send first indication information to the second access network device, where the first indication information indicates that the terminal device supports user plane security protection, and the communication apparatus is a master access network device in the dual connectivity of the terminal device; and the transceiver module 1510 is configured to: receive identification information of a bearer and a security activation status from the second access network device, and send the identification information of the bearer and the security activation status to the terminal device, where the security activation status indicates whether to enable user plane encryption protection and/or user plane integrity protection of the bearer.

In a possible design, the bearer is for transmission of user plane data between the terminal device and the second access network device.

In a possible design, the processing module 1520 is further configured to generate the first indication information based on a context of the terminal device.

In a possible design, the context of the terminal device includes a first security capability of the terminal device, the first security capability indicates that the terminal device supports the user plane security protection, and the first security capability corresponds to the first communication standard.

In a possible design, the context of the terminal device includes a first wireless capability of the terminal device, the first wireless capability indicates that the terminal device supports the user plane security protection, and the first wireless capability corresponds to the first communication standard.

In a possible design, if the user plane security policy is "required", a type of the first indication information is reject criticality information; or if the user plane security policy is not "required", a type of the first indication information is ignore criticality information.

In a possible design, the processing module 1520 is further configured to select the second access network device based on the context of the terminal device, where the second access network device supports the user plane security protection.

In a possible design, the context of the terminal device includes a user plane security policy; and the processing module 1520 is specifically configured to select the second access network device based on the user plane security policy if determining that the terminal device supports the user plane security protection.

In a possible design, the transceiver module 1510 is further configured to send, to the second access network device, a user plane security policy that is from a core network device or that is preconfigured in the first access network device.

In a possible design, the transceiver module 1510 is further configured to: receive enablement indication information from the terminal device, where the enablement indication information indicates that the terminal device has enabled user plane security with the second access network device; and send the enablement indication information to the second access network device.

In a possible design, the transceiver module 1510 is further configured to receive an enablement support indication from the second access network device, where the enablement support indication indicates that the second access network device supports the user plane security protection.

In a possible design, the transceiver module 1510 is specifically configured to: send a secondary station addition request to the second access network device, where the secondary station addition request includes the first indication information, and the secondary station addition request is used to request to allocate the resource for the dual connectivity of the terminal device; and receive a secondary station addition response from the second access network device, where the secondary station addition response includes the identification information of the bearer and the security activation status.

In a possible design, the secondary station addition request further includes the user plane security policy.

In a possible design, the transceiver module 1510 is specifically configured to send a reconfiguration message to the terminal device, where the reconfiguration message includes the identification information of the bearer and the security activation status.

When the communication apparatus performs an operation or a step corresponding to the second access network device in the method embodiment shown in FIG. 3, the transceiver module 1510 is configured to: accept a request of a first access network device in a first communication standard for allocating a resource for dual connectivity of a terminal device, and receive first indication information from the first access network device, where the first indication information indicates that the terminal device supports user plane security protection; the processing module 1520 is configured to determine a security activation status based on the first indication information and a user plane security policy; and the transceiver module 1510 is further configured to send identification information of a bearer and the security activation status to the terminal device through the first access network device, where the security activation status indicates whether to enable user plane encryption protection and/or user plane integrity protection of the bearer.

In a possible design, the bearer is for transmission of user plane data between the terminal device and the second access network device.

In a possible design, the transceiver module 1510 is further configured to receive the user plane security policy from the first access network device. Alternatively, the user plane security policy is preconfigured in the second access network device.

In a possible design, if the user plane security policy is "required", a type of the first indication information is reject criticality information; or if the user plane security policy is not "required", a type of the first indication information is ignore criticality information.

In a possible design, the transceiver module 1510 is further configured to send an enablement support indication to the first access network device, where the enablement support indication indicates that the second access network device supports user plane security protection.

In a possible design, the transceiver module 1510 is further configured to receive enablement indication information from the terminal device through the first access network device, where the enablement indication information indicates that the terminal device has enabled user plane security with the second access network device.

In a possible design, the processing module 1520 is further configured to enable user plane security with the terminal device based on the security activation status.

In a possible design, the transceiver module 1510 is specifically configured to: receive a secondary station addition request from the first access network device, where the secondary station addition request includes the first indication information, and the secondary station addition request is used to request to allocate the resource for the dual connectivity of the terminal device; and send a secondary station addition response to the first access network device, where the secondary station addition response includes the identification information of the bearer and the security activation status.

In a possible design, the secondary station addition request includes the user plane security policy.

When the communication apparatus performs an operation or a step corresponding to the first access network device in the method embodiment shown in FIG. 5, the processing module 1520 is configured to: select, based on a context of a terminal device, a second access network device that is in a second communication standard and that supports user plane security protection, where the first access network device is a master access network device in dual connectivity of the terminal device; and request the second access network device to allocate a resource for the dual connectivity of the terminal device, and send a user plane security policy to the second access network device by using the transceiver module 1510; and the transceiver module 1510 is configured to: receive identification information of a bearer and a security activation status from the second access network device; and send the identification information of the bearer and the security activation status to the terminal device, where the security activation status indicates whether to enable user plane encryption protection and/or user plane integrity protection of the bearer.

In a possible design, the bearer is for transmission of user plane data between the terminal device and the second access network device.

In a possible design, the context of the terminal device includes a first security capability of the terminal device, the first security capability indicates that the terminal device supports the user plane security protection, and the first security capability corresponds to the first communication standard.

In a possible design, the context of the terminal device includes a first wireless capability of the terminal device, the first wireless capability indicates that the terminal device supports the user plane security protection, and the first wireless capability corresponds to the first communication standard.

In a possible design, the user plane security policy is received by the first access network device from a core network device or is preconfigured in the first access network device.

In a possible design, the transceiver module 1510 is further configured to: receive enablement indication information from the terminal device, where the enablement indication information indicates that the terminal device has enabled user plane security with the second access network device; and send the enablement indication information to the second access network device.

When the communication apparatus performs an operation or a step corresponding to the second access network device in the method embodiment shown in FIG. 5, the transceiver module 1510 is configured to: accept a request of a first access network device in a first communication standard for allocating a resource for dual connectivity of a terminal device, and receive a user plane security policy from the first access network device; the processing module 1520 is configured to determine a security activation status based on the user plane security policy; and the transceiver module 1510 is further configured to send identification information of a bearer and the security activation status to the terminal device through the first access network device, where the security activation status indicates whether to enable user plane encryption protection and/or user plane integrity protection of the bearer.

In a possible design, the bearer is for transmission of user plane data between the terminal device and the second access network device.

In a possible design, the transceiver module 1510 is further configured to receive enablement indication information from the terminal device through the first access network device, where the enablement indication information indicates that the terminal device has enabled user plane security with the second access network device.

In a possible design, the processing module 1520 is further configured to enable user plane security with the terminal device based on the security activation status.

When the communication apparatus performs an operation or a step corresponding to the second access network device in the method embodiment shown in FIG. 7, the transceiver module 1510 is configured to send first request information to a terminal device through a first access network device in a first communication standard, where the first request information is used to request a support capability of the terminal device for user plane security, the communication apparatus is a secondary access network device in dual connectivity of the terminal device, and the first access network device is a master access network device in the dual connectivity of the terminal device; the transceiver module 1510 is further configured to receive second indication information from the terminal device through the first access network device, where the second indication information indicates that the terminal device supports user plane security protection; the processing module 1520 is configured to determine a security activation status based on the second indication information and a user plane security policy; and the transceiver module 1510 is further configured to send identification information of a bearer and the security activation status to the terminal device through the first access network device, where the security activation status indicates whether to enable user plane encryption protection and/or user plane integrity protection of the bearer.

In a possible design, the bearer is for transmission of user plane data between the terminal device and the second access network device.

In a possible design, the user plane security policy is preconfigured in the second access network device.

In a possible design, the transceiver module 1510 is further configured to receive enablement indication information from the terminal device through the first access network device, where the enablement indication information indicates that the terminal device has enabled user plane security with the second access network device.

In a possible design, the processing module 1520 is further configured to enable user plane security with the terminal device based on the security activation status.

In a possible design, the transceiver module 1510 is further configured to: receive a secondary station addition request from the first access network device, where the secondary station addition request is used to request to allocate a resource for the dual connectivity of the terminal device; and send a secondary station modification response to the first access network device, where the secondary station modification response includes the identification information of the bearer and the security activation status.

When the communication apparatus performs an operation or a step corresponding to the terminal device in the method embodiment shown in FIG. 7, the transceiver module 1510 is configured to: receive first request information from a second access network device in a second communication standard through a first access network device in a first communication standard, where the first request information is used to request a support capability of the terminal device for user plane security; and send second indication information to the second access network device through the first access network device, where the second indication information indicates that the terminal device supports user plane security protection.

In a possible design, the transceiver module 1510 is further configured to receive identification information of a bearer and a security activation status from the second access network device through the first access network device, where the security activation status indicates whether to enable user plane encryption protection and/or user plane integrity protection of the bearer; and the processing module 1520 is configured to enable user plane security with the second access network device based on the security activation status.

In a possible design, the bearer is for transmission of user plane data between the terminal device and the second access network device.

In a possible design, the transceiver module 1510 is further configured to send enablement indication information to the second access network device through the first access network device, where the enablement indication information indicates that the terminal device has enabled the user plane security with the second access network device.

When the communication apparatus performs an operation or a step corresponding to the second access network device in the method embodiment shown in FIG. 9, the processing module 1520 is configured to determine a security activation status based on a user plane security policy, where the communication apparatus is a secondary access network device in dual connectivity of a terminal device; the transceiver module 1510 is configured to send identification information of a bearer and the security activation status to the terminal device through a first access network device in a first communication standard, where the security activation status indicates whether to enable user plane encryption protection and/or user plane integrity protection of the bearer, and the first access network device is a master access network device in the dual connectivity of the terminal device; the transceiver module 1510 is further configured to receive enablement indication information from the terminal device through the first access network device, where the enablement indication information indicates that the terminal device has enabled user plane security with the second access network device; and the processing module 1520 is further configured to enable user plane security with the terminal device based on the enablement indication information and the security activation status.

In a possible design, the bearer is for transmission of user plane data between the terminal device and the second access network device.

In a first possible design, the user plane security policy is preconfigured in the second access network device.

In a possible design, the transceiver module 1510 is further configured to send acknowledgment indication information to the terminal device through the first access network device, where the acknowledgment indication information indicates the terminal device to send the enablement indication information after the terminal device enables the user plane security with the second access network device.

In a possible design, the transceiver module 1510 is further configured to: receive a secondary station addition request from the first access network device, where the secondary station addition request is used to request to allocate a resource for the dual connectivity of the terminal device; and send a secondary station addition response to the first access network device, where the secondary station addition response includes the identification information of the bearer and the security activation status.

In a possible design, the secondary station addition response includes the acknowledgment indication information.

When the communication apparatus performs an operation or a step corresponding to the terminal device in the method embodiment shown in FIG. 9, the transceiver module 1510 is configured to receive identification information of a bearer and a security activation status from a second access network device in a second communication standard through a first access network device in a first communication standard, where the security activation status indicates whether to enable user plane encryption protection and/or user plane integrity protection of the bearer; the processing module 1520 is configured to enable user plane security with the second access network device based on the security activation status; and the transceiver module 1510 is further configured to send enablement indication information to the second access network device through the first access network device, where the enablement indication information indicates that the terminal device has enabled the user plane security with the second access network device.

In a possible design, the bearer is for transmission of user plane data between the terminal device and the second access network device.

In a possible design, the transceiver module 1510 is further configured to receive acknowledgment indication information from the second access network device through the first access network device, where the acknowledgment indication information indicates the terminal device to send the enablement indication information after the terminal device enables the user plane security with the second access network device.

The processing module 1520 in the communication apparatus may be implemented by at least one processor or a processor-related circuit component, and the transceiver module 1510 may be implemented by at least one transceiver, a transceiver-related circuit component, or a communication interface. Operations and/or functions of the modules in the communication apparatus are separately used to implement corresponding procedures of the methods shown in FIG. 3 to FIG. 14. For brevity, details are not described herein again. Optionally, the communication apparatus may further include a storage module. The storage module may be configured to store data and/or instructions.

The transceiver module 1510 and/or the processing module 1520 may read the data and/or the instructions in the storage module, so that the communication apparatus implements the corresponding method. The storage module may be implemented, for example, by using at least one memory.

The storage module, the processing module, and the transceiver module may exist separately, or all or some of the modules may be integrated. For example, the storage module and the processing module are integrated, or the processing module and the transceiver module are integrated.

Figure 16:
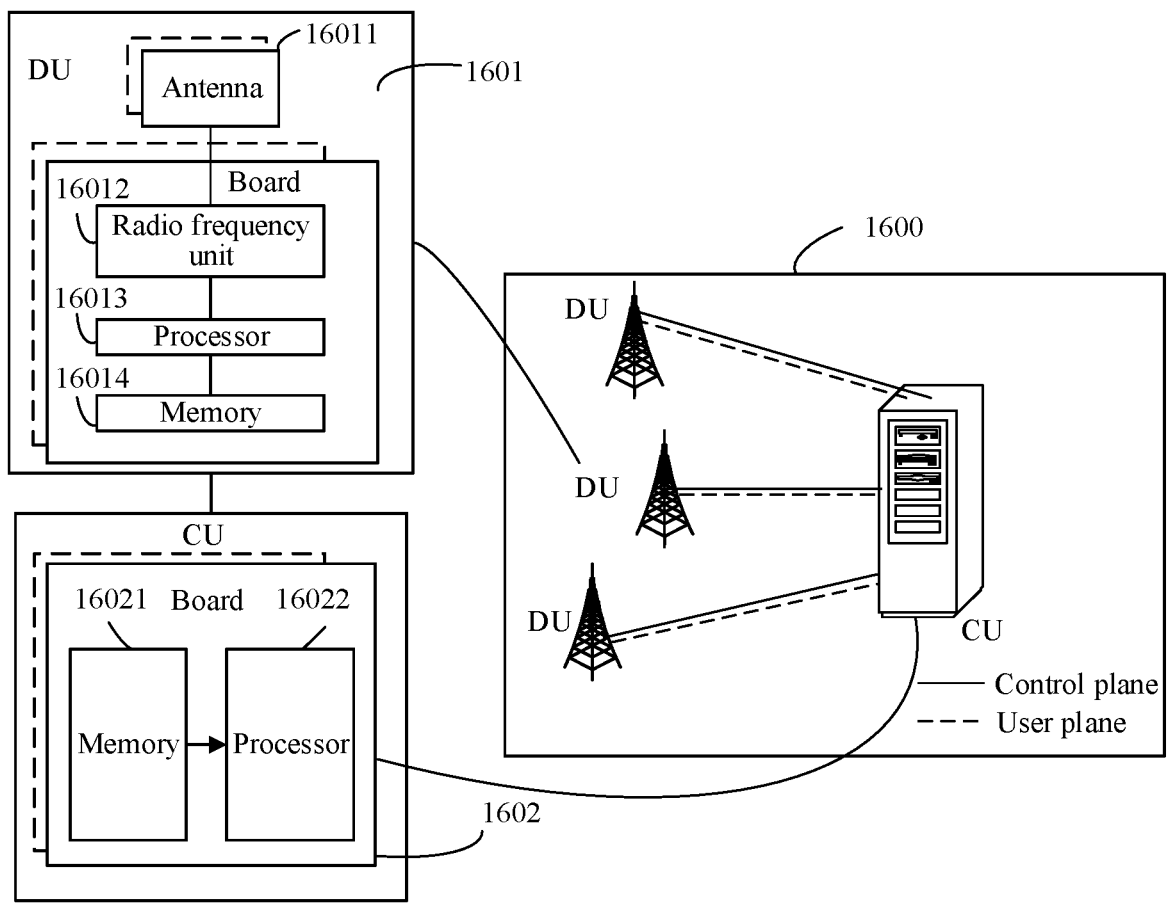

FIG. 16 is a schematic diagram of another structure of a communication apparatus according to an embodiment of this application. The communication apparatus may be specifically an access network device, for example, a base station, and is configured to implement a function of the first access network device or the second access network device in any one of the foregoing method embodiments.

The access network device 1600 includes one or more DUs 1601 and one or more CUs 1602. The DU 1601 may include at least one antenna 16011, at least one radio frequency unit 16012, at least one processor 16013, and at least one memory 16014. The DU 1601 is mainly configured to receive and send radio frequency signals, convert a radio frequency signal and a baseband signal, and perform some baseband processing.

The CU 1602 may include at least one processor 16022 and at least one memory 16021. The CU 1602 is mainly configured to perform baseband processing, control a base station, and the like. The CU 1602 is a control center of the base station, and may also be referred to as a processing unit. For example, the CU 1602 may be configured to control the base station to perform operations or steps corresponding to the first access network device or the second access network device in the methods shown in FIG. 3 to FIG. 14.

The CU 1602 and the DU 1601 may communicate with each other through an interface. A control plane (control plane, CP) interface may be Fs-C, for example, F1-C, and a user plane (user plane, UP) interface may be Fs-U, for example, F1-U. The DU 1601 and the CU 1602 may be physically disposed together, or may be physically disposed separately (that is, form a distributed base station). This is not limited.

Specifically, baseband processing on the CU and the DU may be divided based on a protocol layer of a wireless network. For example, functions of a PDCP layer and a layer above the PDCP layer are deployed on the CU, and functions of protocol layers (such as an RLC layer and a MAC layer) below the PDCP layer are deployed on the DU. For another example, the CU implements functions of an RRC layer and a PDCP layer, and the DU implements functions of an RLC layer, a MAC layer, and a physical (physical, PHY) layer.

Optionally, the network device 1600 may include one or more radio frequency units (RU), one or more DUs, and one or more CUs. The DU may include at least one processor 16013 and at least one memory 16014. The RU may include at least one antenna 16011 and at least one radio frequency unit 16012. The CU may include at least one processor 16022 and at least one memory 16021.

In an embodiment, the CU 1602 may include one or more boards. A plurality of boards may jointly support a radio access network (for example, a 5G network) with a single access standard, or may separately support radio access networks (for example, an LTE network, a 5G network, or another network) with different access standards. The memory 16021 and the processor 16022 may serve one or more boards. In other words, a memory and a processor may be disposed on each board. Alternatively, a plurality of boards may share a same memory and a same processor. In addition, a necessary circuit may further be disposed on each board.

The DU 1601 may include one or more boards. A plurality of boards may jointly support a radio access network (for example, a 5G network) with a single access standard, or may separately support radio access networks (for example, an LTE network, a 5G network, or another network) with different access standards. The memory 16014 and the processor 16013 may serve one or more boards. In other words, a memory and a processor may be disposed on each board. Alternatively, a plurality of boards may share a same memory and a same processor. In addition, a necessary circuit may further be disposed on each board.

Figure 17:
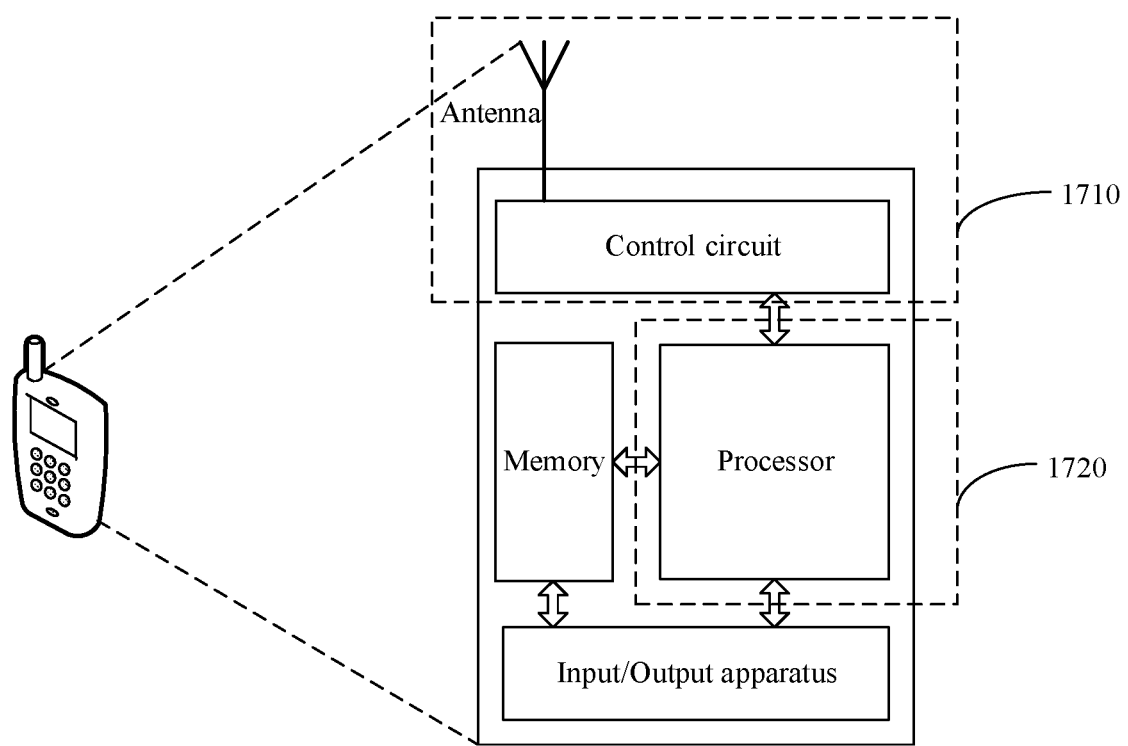

FIG. 17 is a schematic diagram of another structure of a communication apparatus according to an embodiment of this application. The communication apparatus may be specifically a terminal device. The communication apparatus may be configured to implement functions of the terminal device in any one of the foregoing method embodiments. For ease of understanding and illustration, an example in which the terminal device is a mobile phone is used in FIG. 17. As shown in FIG. 17, the terminal device includes a processor, and may further include a memory. Certainly, the terminal device may further include a radio frequency circuit, an antenna, an input/output apparatus, and the like. The processor is mainly configured to: process a communication protocol and communication data, control the terminal device, execute a software program, process data of the software program, and the like. The memory is mainly configured to store the software program and data. The radio frequency circuit is mainly configured to perform conversion between a baseband signal and a radio frequency signal, and process the radio frequency signal. The antenna is mainly configured to receive and send radio frequency signals in a form of electromagnetic waves. The input/output apparatus, such as a touchscreen, a display, or a keyboard, is mainly configured to: receive data input by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 17 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 17, the terminal device includes a transceiver unit 1710 and a processing unit 1720.

The transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 1710 and that is configured to implement a receiving function may be considered as a receiving unit, and a component that is in the transceiver unit 1710 and that is configured to implement a sending function may be considered as a sending unit. In other words, the transceiver unit 1710 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like. It should be understood that the transceiver unit 1710 is configured to perform a sending operation and a receiving operation on the terminal side in the foregoing method embodiments, and the processing unit 1720 is configured to perform an operation other than the receiving and sending operations on the terminal in the foregoing method embodiments.

An embodiment of this application further provides a chip system, including a processor. The processor is coupled to a memory. The memory is configured to store a program or instructions. When the program or the instructions are executed by the processor, the chip system is enabled to implement the method corresponding to the terminal device or the method corresponding to the network device in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (field programmable gate array, FPGA), an application-specific integrated circuit (application-specific integrated circuit, ASIC), a system on a chip (system on a chip, SoC), a central processing unit (central processing unit, CPU), a network processor (network processor, NP), a digital signal processor (digital signal processor, DSP), a micro controller unit (micro controller unit, MCU), a programmable logic device (programmable logic device, PLD), or another integrated chip.

It should be understood that the steps in the foregoing method embodiments may be completed by using a hardware integrated logic circuit in the processor or instructions in a form of software. The steps of the method disclosed with reference to embodiments of this application may be directly performed by a hardware processor, or may be performed by a combination of hardware and software modules in the processor.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a first access network device, a second access network device, and a terminal device. Optionally, the communication system may further include a core network device.

It should be understood that, the processor in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (read-only memory, ROM), a programmable read-only memory, an erasable programmable read-only memory, an electrically erasable programmable read-only memory, or a flash memory. The volatile memory may be a random access memory (random access memory, RAM), used as an external cache. By way of example rather than not limitation, many forms of RAMs are available, such as a static random access memory, a dynamic random access memory, a synchronous dynamic random access memory, a double data rate synchronous dynamic random access memory, an enhanced synchronous dynamic random access memory, a synchlink dynamic random access memory, and a direct rambus random access memory.

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that numbers in various embodiments of this application are merely used for differentiation for ease of description. Sequence numbers of the foregoing processes or steps do not mean execution sequences. The execution sequences of the processes or steps should be determined based on functions and internal logic of the processes or steps, and should not constitute any limitation on the implementation processes of embodiments of the present invention.

A person of ordinary skill in the art may be aware that, in combination with the examples described in embodiments disclosed in this specification, units and algorithm steps may be implemented by electronic hardware or a combination of computer software and electronic hardware. Whether the functions are implemented by hardware or software depends on specific applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit.

When the function is implemented in a form of a software function unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

What is claimed is:

1. A method for security activation, wherein the method comprises:
   selecting based on a context of a terminal device, by a first access network device in a first communication standard, a second access network device that is in a second communication standard and that supports user plane security protection, wherein the first access network device is a master access network device in dual connectivity of the terminal device;
   requesting, by the first access network device, the second access network device to allocate a resource for the dual connectivity of the terminal device,
   sending, by the first access network device, a user plane security policy to the second access network device;
   receiving, by the first access network device, identification information of a bearer and a security activation status from the second access network device; and
   sending, by the first access network device, the identification information of the bearer and the security activation status to the terminal device, wherein the security activation status indicates whether to enable at least one of user plane encryption protection or user plane integrity protection of the bearer.

2. The method according to claim 1, wherein the method further comprises:
   determining, by the first access network device, whether the terminal device supports the user plane security protection; and
   in response to determining that the terminal device supports the user plane security protection, selecting, by the first access network device, based on the user plane security policy, the second access network device that supports the user plane security protection, and sending, by the first access network device, the user plane security policy to the second access network device.

3. The method according to claim 2, wherein the method further comprises:
   determining, by the second access network device, the security activation status based on the user plane security policy, and
   sending, by the second access network device, the security activation status to the terminal device.

4. The method according to claim 1, wherein the bearer is for transmission of user plane data between the terminal device and the second access network device.

5. The method according to claim 1, wherein the context of the terminal device includes a first security capability of the terminal device, the first security capability indicates that the terminal device supports the user plane security protection, and the first security capability corresponds to the first communication standard.

6. The method according to claim 1, wherein the context of the terminal device includes a first wireless capability of the terminal device, the first wireless capability indicates that the terminal device supports the user plane security protection, and the first wireless capability corresponds to the first communication standard.

7. The method according to claim 1, wherein the user plane security policy is received by the first access network device from a core network device.

8. The method according to claim 1, wherein the user plane security policy is preconfigured in the first access network device.

9. The method according to claim 1, wherein the method further comprises:
   receiving, by the first access network device, enablement indication information from the terminal device, wherein the enablement indication information indicates that the terminal device has enabled user plane security with the second access network device; and sending, by the first access network device, the enablement indication information to the second access network device.

10. An apparatus, comprising at least one processor and at least one memory storing instructions which, when executed by the at least one processor, cause the apparatus to:
- select, based on a context of a terminal device, a second access network device that is in a second communication standard and that supports user plane security protection, wherein the apparatus is a first access network device in a first communication standard, and wherein the first access network device is a master access network device in dual connectivity of the terminal device;
- request the second access network device to allocate a resource for the dual connectivity of the terminal device,
- send a user plane security policy to the second access network device;
- receive identification information of a bearer and a security activation status from the second access network device; and
- send the identification information of the bearer and the security activation status to the terminal device, wherein the security activation status indicates whether to enable at least one of user plane encryption protection or user plane integrity protection of the bearer.

11. The apparatus according to claim 10, wherein the instructions further cause the apparatus to:
- determine whether the terminal device supports the user plane security protection; and
- in response to determining that the terminal device supports the user plane security protection, select, based on the user plane security policy, the second access network device that supports the user plane security protection, and sending, by the first access network device, the user plane security policy to the second access network device.

12. The apparatus according to claim 10, wherein the bearer is for transmission of user plane data between the terminal device and the second access network device.

13. The apparatus according to claim 10, wherein the context of the terminal device includes a first security capability of the terminal device, the first security capability indicates that the terminal device supports the user plane security protection, and the first security capability corresponds to the first communication standard.

14. The apparatus according to claim 10, wherein the context of the terminal device includes a first wireless capability of the terminal device, the first wireless capability indicates that the terminal device supports the user plane security protection, and the first wireless capability corresponds to the first communication standard.

15. The apparatus according to claim 10, wherein the user plane security policy is received by the first access network device from a core network device.

16. The apparatus according to claim 10, wherein the user plane security policy is preconfigured in the first access network device.

17. The apparatus according to claim 10, wherein the instructions further cause the apparatus to:
- receive enablement indication information from the terminal device, wherein the enablement indication information indicates that the terminal device has enabled user plane security with the second access network device; and
- send the enablement indication information to the second access network device.

18. A non-transitory computer-readable storage medium storing instructions which, when executed by an apparatus, cause the apparatus to:
- select, based on a context of a terminal device, a second access network device that is in a second communication standard and that supports user plane security protection, wherein the apparatus is a first access network device, and wherein the first access network device is a master access network device in dual connectivity of the terminal device;
- request the second access network device to allocate a resource for the dual connectivity of the terminal device,
- send a user plane security policy to the second access network device;
- receive identification information of a bearer and a security activation status from the second access network device; and
- send the identification information of the bearer and the security activation status to the terminal device, wherein the security activation status indicates whether to enable at least one of user plane encryption protection or user plane integrity protection of the bearer.

19. The non-transitory computer-readable storage medium according to claim 18, wherein the instructions further cause the apparatus to:
- determine whether the terminal device supports the user plane security protection; and
- in response to determining that the terminal device supports the user plane security protection, select, based on the user plane security policy, the second access network device that supports the user plane security protection, and sending, by the first access network device, the user plane security policy to the second access network device.

20. The non-transitory computer-readable storage medium according to claim 18, wherein the bearer is for transmission of user plane data between the terminal device and the second access network device.

* * * * *